(12) United States Patent
Lee et al.

(10) Patent No.: US 10,990,231 B2
(45) Date of Patent: Apr. 27, 2021

(54) TOUCH DISPLAY APPARATUS AND METHOD OF MANUFACTURING THE SAME

(71) Applicant: Samsung Display Co., Ltd, Yongin-si (KR)

(72) Inventors: Jongwon Lee, Seongnam-si (KR); Jongoh Kim, Asan-si (KR); Jeong-Young Kim, Gyeongsangbuk-do (KR); Sooguy Rho, Suwon-si (KR); Juyong Park, Asan-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 15/413,607

(22) Filed: Jan. 24, 2017

(65) Prior Publication Data

US 2017/0212625 A1    Jul. 27, 2017

(30) Foreign Application Priority Data

Jan. 26, 2016 (KR) .......................... 10-2016-0009260

(51) Int. Cl.
*G06F 3/044* (2006.01)
*G06F 3/041* (2006.01)
(Continued)

(52) U.S. Cl.
CPC ........ *G06F 3/0443* (2019.05); *G02F 1/13338* (2013.01); *G02F 1/13439* (2013.01); *G02F 1/133345* (2013.01); *G06F 3/0412* (2013.01); *G06F 3/04164* (2019.05); *G02F 1/1368* (2013.01); *G02F 1/133512* (2013.01); *G02F 1/133514* (2013.01); *G02F 2001/133519* (2013.01); *G02F 2201/121* (2013.01); *G02F 2201/123* (2013.01); *G02F 2203/01* (2013.01); *G06F 2203/04103* (2013.01)

(58) Field of Classification Search
CPC ......... G02F 1/133512; G02F 1/133345; G02F 1/13338; H01J 2329/4669; H01J 2329/4673; G06F 3/041; G06F 3/0412; G06F 2203/041; G06F 2203/04103; G06F 2203/04112; B32B 2457/208
See application file for complete search history.

(56) References Cited

U.S. PATENT DOCUMENTS

2014/0354906 A1* 12/2014 Wu .......................... G06F 3/041
  349/12
2015/0060125 A1* 3/2015 Stevenson ............... G06F 3/044
  174/261

(Continued)

FOREIGN PATENT DOCUMENTS

KR    10-2013-0136376 A    12/2013

*Primary Examiner* — Edmond C Lau
*Assistant Examiner* — Mariam Qureshi
(74) *Attorney, Agent, or Firm* — Innovation Counsel LLP

(57) ABSTRACT

A touch display apparatus includes a first substrate, a touch electrode, an insulating pattern, a second substrate and a liquid crystal layer. The touch electrode is disposed on a first surface of the first substrate. The insulating pattern is disposed on the touch electrode. The insulating pattern has a refractive index same as a refractive index of the touch electrode. The second substrate faces a second surface of the first substrate opposite to the first surface of the first substrate. The liquid crystal layer is disposed between the first substrate and the second substrate.

20 Claims, 15 Drawing Sheets

(51) Int. Cl.
    *G02F 1/1333*     (2006.01)
    *G02F 1/1343*     (2006.01)
    *G02F 1/1335*     (2006.01)
    *G02F 1/1368*     (2006.01)

(56) References Cited

U.S. PATENT DOCUMENTS

| | | | |
|---|---|---|---|
| 2015/0070309 A1* | 3/2015 | Kang | G06F 3/044 |
| | | | 345/174 |
| 2015/0083464 A1* | 3/2015 | Zilbauer | G06F 3/041 |
| | | | 174/251 |
| 2015/0169107 A1* | 6/2015 | Misaki | G06F 3/0412 |
| | | | 345/174 |
| 2017/0276986 A1* | 9/2017 | Chen | G02F 1/13338 |
| 2017/0329436 A1* | 11/2017 | Choi | G06F 3/041 |

* cited by examiner

TOUCH DISPLAY APPARATUS AND METHOD OF MANUFACTURING THE SAME

PRIORITY STATEMENT

This application claims priority under 35 U.S.C. § 119 to Korean Patent Application No. 10-2016-0009260 filed on Jan. 26, 2016 in the Korean Intellectual Property Office KIPO, the content of which is herein incorporated by reference in its entirety.

BACKGROUND

1. Field

Exemplary embodiments of the present inventive concept relate to a touch display apparatus and a method of manufacturing the touch display apparatus. More particularly, exemplary embodiments of the present inventive concept relate to a touch display apparatus for improving a display quality and a method of manufacturing the touch display apparatus.

2. Description of the Related Art

As information technology developed, a demand for various display apparatuses increased. Accordingly, much research efforts have been directed to development and improvement of liquid crystal display ("LCD") apparatus, plasma display panel ("PDP"), field emission display ("FED") apparatus, an electrophoretic display ("EPD") apparatus, and organic light emitting display ("OLED") apparatus.

A touch screen panel function may be incorporated into the display apparatus. The touch screen panel is an input device for inputting instructions by touching the screen of the display apparatus with an input object such as a finger or a pen. The touch screen panel can be used as a substitute for an additional input device such as a keyboard or a mouse which is connected to the display apparatus. By eliminating the necessity for extra chords and peripheral devices, touch screen panel became widely adopted.

The touch screen panel may be divided into a resistive type, a photosensitive type and a capacitive type. In the capacitive type touch screen panel, when the input object such as the finger or the pen is touched on the touch screen panel, change of capacitance is sensed by adjacent conductive sensing patterns or by a conductive sensing pattern and a ground electrode. The change of capacitance may be converted into an electric signal representing a touch position.

The touch screen panel may be combined with the liquid crystal display apparatus to form the touch display apparatus. However, a touch electrode of the touch display apparatus may be damaged during manufacturing of the touch display apparatus. In addition, a refractive index of the touch electrode may be different from a refractive index of an insulating layer covering the touch electrode so that the touch electrode may be shown to a user.

SUMMARY

Exemplary embodiments of the present inventive concept provide a touch display apparatus for improving a display quality.

Exemplary embodiments of the present inventive concept also provide a method of manufacturing the above-mentioned touch display apparatus.

In an exemplary embodiment of a touch display apparatus according to the present inventive concept, the touch display apparatus includes a first substrate, a touch electrode, an insulating pattern, a second substrate and a liquid crystal layer. The touch electrode is disposed on a first surface of the first substrate. The insulating pattern is disposed on the touch electrode. The insulating pattern has a refractive index same as a refractive index of the touch electrode. The second substrate faces a second surface of the first substrate opposite to the first surface of the first substrate. The liquid crystal layer is disposed between the first substrate and the second substrate.

In an exemplary embodiment, the touch electrode may include a transparent conductive material.

In an exemplary embodiment, the touch electrode may further include a pad electrode. The insulating pattern may include a contact hole exposing the pad electrode.

In an exemplary embodiment, the refractive index of the touch electrode may be equal to or greater than about 1.7 and equal to or less than about 2.2.

In an exemplary embodiment, the insulating pattern may include a first sub insulating pattern having a first refractive index less than the refractive index of the touch electrode and a second sub insulating pattern having a second refractive index greater than the first refractive index.

In an exemplary embodiment, the first refractive index may be equal to or greater than about 1.4 and equal to or less than about 1.6. The second refractive index may be equal to or greater than about 1.8 and equal to or less than about 2.3.

In an exemplary embodiment, the first sub insulating pattern may include silicon oxide (SiOx). The second sub insulating pattern may include silicon nitride (SiNx), titanium oxide (TiOx) or niobium oxide (NbOx).

In an exemplary embodiment, the insulating pattern may include a first material having a first refractive index less than the refractive index of the touch electrode and a second material having a second refractive index greater than the first refractive index.

In an exemplary embodiment, the first refractive index of the first material may be equal to or greater than about 1.4 and equal to or less than about 1.6. The second refractive index of the second material may be equal to or greater than about 1.8 and equal to or less than about 2.3.

In an exemplary embodiment, the first material may include silicon oxide (SiOx).

The second material may include silicon nitride (SiNx), titanium oxide (TiOx) or niobium oxide (NbOx).

In an exemplary embodiment of a method of manufacturing a touch display apparatus according to the present inventive concept, the method includes forming a touch electrode on a first surface of a first substrate, depositing an insulating layer on first surface of the first substrate on which the touch electrode is formed, forming a second substrate facing a second surface of the first substrate opposite to the first surface of the first substrate, forming a liquid crystal layer between the first substrate and the second substrate and patterning the insulating layer to form an insulating pattern. The insulating pattern has a refractive index same as a refractive index of the touch electrode.

In an exemplary embodiment, the touch electrode may include a transparent conductive material.

In an exemplary embodiment, the touch electrode may further include a pad electrode. The insulating pattern may include a contact hole exposing the pad electrode.

In an exemplary embodiment, the refractive index of the touch electrode may be equal to or greater than about 1.7 and equal to or less than about 2.2.

In an exemplary embodiment, the insulating pattern may include a first sub insulating pattern having a first refractive index less than the refractive index of the touch electrode and a second sub insulating pattern having a second refractive index greater than the first refractive index.

In an exemplary embodiment, the first refractive index may be equal to or greater than about 1.4 and equal to or less than about 1.6. The second refractive index may be equal to or greater than about 1.8 and equal to or less than about 2.3.

In an exemplary embodiment, the first sub insulating pattern may include silicon oxide (SiOx). The second sub insulating pattern may include silicon nitride (SiNx), titanium oxide (TiOx) or niobium oxide (NbOx).

In an exemplary embodiment, the insulating pattern may include a first material having a first refractive index less than the refractive index of the touch electrode and a second material having a second refractive index greater than the first refractive index.

In an exemplary embodiment, the first refractive index of the first material may be equal to or greater than about 1.4 and equal to or less than about 1.6. The second refractive index of the second material may be equal to or greater than about 1.8 and equal to or less than about 2.3.

In an exemplary embodiment, the first material may include silicon oxide (SiOx). The second material may include silicon nitride (SiNx), titanium oxide (TiOx) or niobium oxide (NbOx).

According to the touch display apparatus and the method of manufacturing the touch display apparatus of the present inventive concept, after the liquid crystal layer is formed between the first substrate and the second substrate, the insulating layer is patterned to form the insulating pattern. Thus, the touch electrode is prevented from being damaged in the manufacturing steps. In addition, heat treatment may be applied to the touch electrode by heat generated in a step of forming the liquid crystal layer and in a step of patterning the insulating layer. Thus, resistive characteristics and optical characteristics of the touch electrode may be improved due to crystallization of a transparent conductive material of the touch electrode by the heat treatment.

In addition, the refractive index of the insulating pattern of the touch display apparatus may be substantially the same as the refractive index of the touch electrode so that the touch electrode may not be shown to a user.

BRIEF DESCRIPTION OF THE DRAWINGS

The above and other features and advantages of the present inventive concept will become more apparent by describing in detailed exemplary embodiments thereof with reference to the accompanying drawings, in which.

DETAILED DESCRIPTION OF THE INVENTIVE CONCEPT

Hereinafter, the present inventive concept will be explained in detail with reference to the accompanying drawings.

Figure 1:
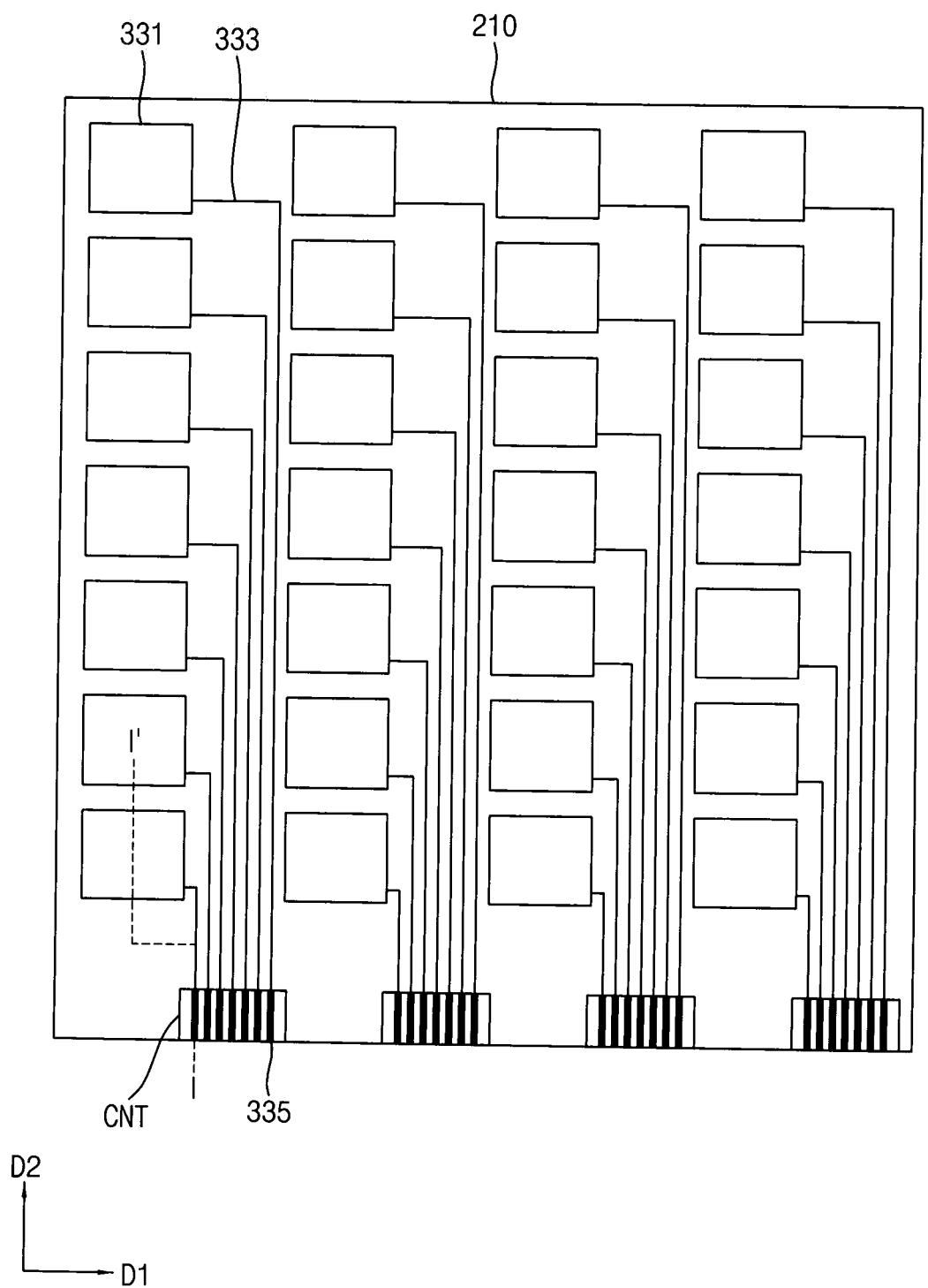
FIG. 1 is a plan view illustrating a touch display apparatus according to an exemplary embodiment of the present inventive concept.
Figure 2:
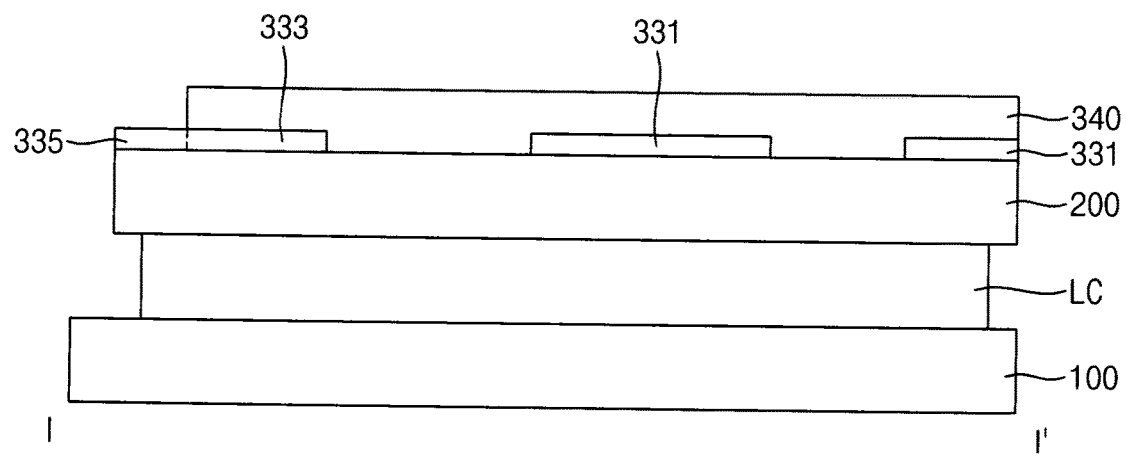
FIG. 2 is a cross-sectional view illustrating the touch display apparatus of FIG. 1 cut along a line I-I'.
Figure 3:
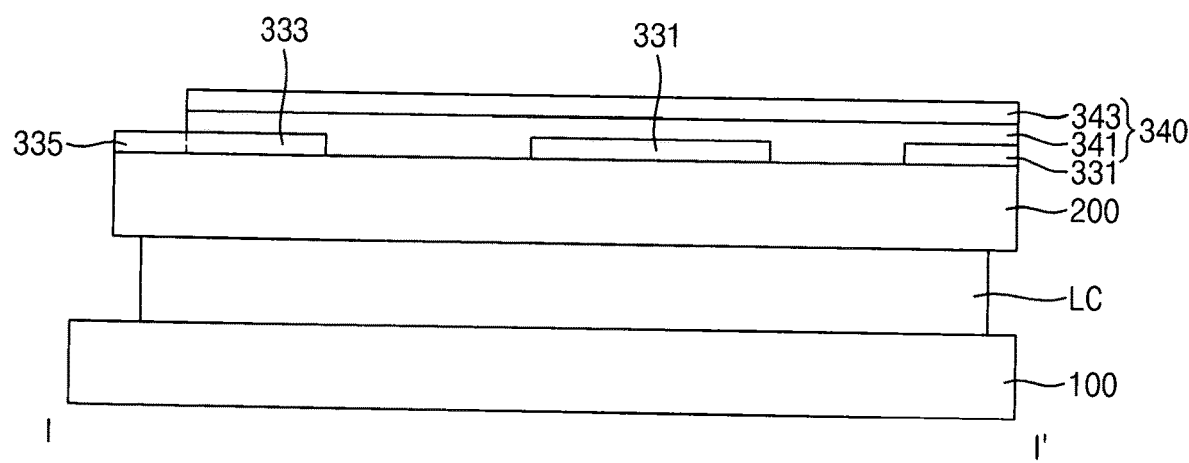
FIG. 3 is a cross-sectional view illustrating the touch display apparatus of FIG. 1 cut along a line I-I'.
Figure 14:
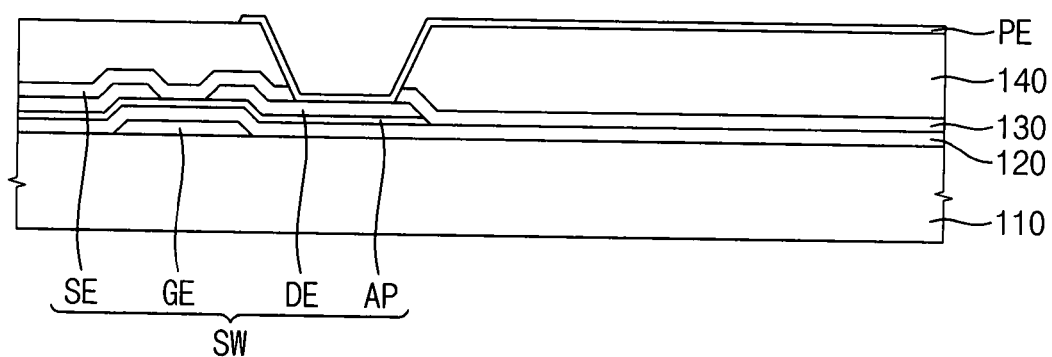
FIG. 14 is a cross-sectional view illustrating a first substrate of FIGS. 2 and 3.
Figure 20:
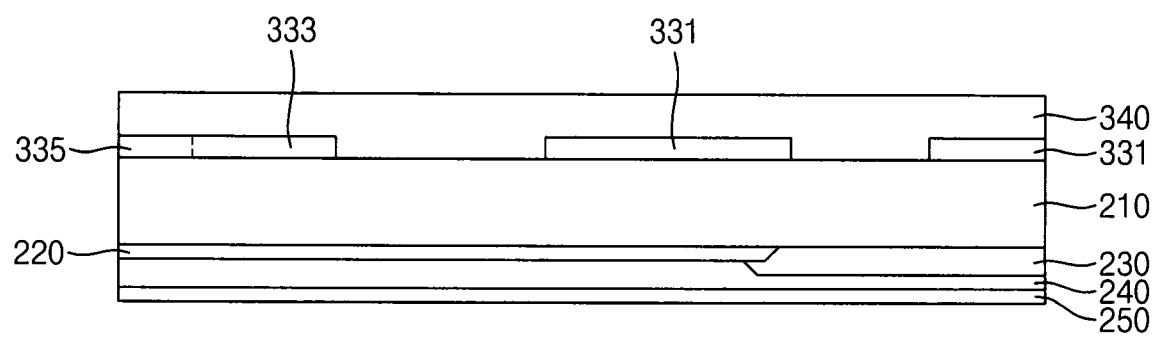
FIG. 20 is a cross-sectional view illustrating a second substrate of FIG. 2.

FIG. 1 is a plan view illustrating a touch display apparatus according to an exemplary embodiment of the present inventive concept. FIG. 2 is a cross-sectional view illustrating the touch display apparatus of FIG. 1 cut along a line I-I'. FIG. 3 is a cross-sectional view illustrating the touch display apparatus of FIG. 1 cut along a line I-I'. FIG. 14 is a cross-sectional view illustrating a first substrate of FIGS. 2 and 3. FIG. 20 is a cross-sectional view illustrating a second substrate of FIG. 2.

Referring to FIGS. 1 to 3, 14 and 20, the touch display apparatus includes a liquid crystal display apparatus and a touch electrode disposed on the liquid crystal display apparatus. The liquid crystal display apparatus includes a first substrate 100, a second substrate 200 and a liquid crystal layer LC. The first substrate 100 may include a thin film transistor substrate 110, a gate electrode GE, a source electrode SE, a drain electrode DE, an active pattern AP, a pixel electrode PE, a first insulating layer 120, a second insulating layer 130 and an organic layer 140. The second substrate 200 may include a color filter substrate 210, a black matrix 220, a color filter 230, an overcoating layer 240 and a common electrode 250.

The thin film transistor substrate 110 may include one of a glass substrate, a quartz substrate, a silicon substrate, a plastic substrate and so on.

The gate electrode GE is formed on the thin film transistor substrate 110. The gate electrode GE is electrically connected to a gate line. The gate electrode GE may include copper (Cu), silver (Ag), chromium (Cr), molybdenum (Mo), aluminum (Al), titanium (Ti), manganese (Mn) or an alloy thereof. The gate electrode GE may include a single layer. The gate electrode GE may include plural layers including different metals. For example, the gate electrode GE may include a lower layer including titanium (Ti) and a upper layer disposed on the lower layer and including copper (Cu).

The first insulating layer 120 is formed on the gate electrode GE. The first insulating layer 120 covers the thin film transistor substrate 110 and a first conductive pattern which includes the gate electrode GE. The first insulating layer 120 may include an inorganic insulating material. For example, the first insulating layer 120 may include silicon oxide (SiOx) or silicon nitride (SiNx). For example, the first insulating layer 120 may include silicon oxide (SiOx) and have a thickness of 500□. The first insulating layer 120 may have plural layers including different materials.

The active pattern AP is formed on the first insulating layer 120. The active pattern AP is formed on the first insulating layer 120. The active pattern AP is formed in an area where the gate electrode GE is formed. The active pattern AP overlaps the gate electrode GE. The active pattern AP partially overlaps the source electrode SE and the drain electrode DE. The active pattern AP may be disposed between the gate electrode GE and the source electrode SE. The active pattern AP may be disposed between the gate electrode GE and the drain electrode DE.

The source electrode SE and the drain electrode DE are formed on the active pattern AP. The source electrode SE and the drain electrode DE are spaced apart from each other on the active pattern AP. The source electrode SE and the drain electrode DE may be formed on the same layer as a data line.

The source electrode SE and the drain electrode DE may include copper (Cu), silver (Ag), chromium (Cr), molybdenum (Mo), aluminum (Al), titanium (Ti), manganese (Mn) or an alloy thereof. The source electrode SE and the drain electrode DE may include a single layer. In some embodiments, the source electrode SE and the drain electrode DE may include plural layers including different metals. For example, the source electrode SE and the drain electrode DE may include a copper (Cu) layer and a titanium (Ti) layer disposed on or under the copper (Cu) layer.

The second insulating layer 130 is formed on the source electrode SE and the drain electrode DE. The second insulating layer 130 may include at least one of a silicon oxide (SiOx) and a silicon nitride (SiNx).

The organic layer 140 is formed on the second insulating layer 130. The organic layer 140 may planarize an upper surface of the first substrate 100 so that a problem due to an uneven upper surface, such as a signal wiring being cut off, may be prevented. The organic layer 140 may be an insulating layer including an organic material. The organic layer 140 may be a color filter.

The pixel electrode PE is formed on the organic layer 140. The pixel electrode PE is electrically connected to the drain electrode DE through a contact hole. The pixel electrode PE may include a transparent conductive material. For example, the pixel electrode PE may include indium tin oxide (ITO) or indium zinc oxide (IZO). Alternatively, the pixel electrode PE may include titanium (Ti) or an alloy (MoTi) of molybdenum and titanium.

The color filter substrate 210 may include a glass substrate, a quartz substrate, a silicon substrate, a plastic substrate, and so on.

The black matrix 220 is disposed on the color filter substrate 210. The black matrix 220 is formed in an area where the gate line, the data line, the gate electrode GE, the source electrode SE and the drain electrode DE are disposed. The black matrix 220 corresponds to a peripheral region adjacent to a display region displaying an image. The image may not be displayed on the peripheral region. The black matrix 220 blocks light.

The color filter 230 is disposed on the color filter substrate 210 on which the black matrix 220 is formed. The color filter 230 provides color to the light passing through the liquid crystal layer LC. The color filter 230 may include a red color filter, a green color filter and a blue color filter. The color filter 230 may correspond to a unit pixel. The colors of the color filters 230 corresponding to adjacent unit pixels may be different from each other. The color filter 230 may be overlapped with the adjacent color filter at a boundary area of the adjacent unit pixels. Alternatively, the color filter 230 may be spaced apart from the adjacent color filter.

The overcoating layer 240 is formed on the color filter 230 and the black matrix 220. The overcoating layer 240 planarizes the color filter 230, protects the color filter 230 and insulates the color filter 230. The overcoating layer 240 may include epoxy acrylate element.

The common electrode 250 may be formed on the overcoating layer 240.

The liquid crystal layer LC is disposed between the thin film transistor substrate 110 and the color filter substrate 210. The liquid crystal layer LC includes liquid crystal molecules having an optical anisotropy. The liquid crystal molecules are driven by an electric field such that the liquid crystal molecules transmit or block light passing through the liquid crystal layer LC to display an image.

In addition, the touch display apparatus may further include a light source part disposed under a display panel or disposed in a side of the display panel.

The black matrix 220, the color filter 230, the overcoating layer 240 and the common electrode 250 are disposed on a first surface of the color filter substrate 210.

The touch electrode and an insulating pattern 340 are disposed on a second surface of the color filter substrate 210 which is opposite to the first surface. The "touch electrode," as used herein, is one or more electrically conductive parts that help detect touch, and may include a sensing pattern 331, a connecting line 333 and a pad electrode 335 in one embodiment.

The sensing pattern 331 may include a transparent conductive material. For example, the sensing pattern 331 may include indium tin oxide (ITO) or indium zinc oxide (IZO). Alternatively, the sensing pattern 331 may include titanium (Ti) or an alloy (MoTi) of molybdenum and titanium.

In addition, the sensing pattern 331 may have a refractive index equal to or greater than about 1.7 and equal to or less than about 2.2. The sensing pattern 331 may have the refractive index substantially the same as a refractive index of the insulating pattern 340.

The connecting line 333 may include a low resistive material or a transparent conductive material. For example, the connecting line 333 may include molybdenum (Mo), silver (Ag), titanium (Ti), copper (Cu), molybdenum/aluminum/molybdenum (Mo/Al/Mo). However, the present inventive concept is not limited to the above mentioned materials. The connecting line 333 may include a material substantially the same as the material of the sensing pattern 331. For example, the connecting line 333 may include indium tin oxide (ITO) or indium zinc oxide (IZO). Alternatively, the connecting line 333 may include titanium (Ti) or an alloy (MoTi) of molybdenum and titanium.

The connecting line 333 and the sensing pattern 331 may be formed on a same layer. However, the present inventive concept is not limited thereto. The connecting line 333 may be formed on a layer different from the layer of the sensing pattern 331. In addition, the connecting line 333 may include the material different from the material of the sensing pattern 331.

The sensing pattern 331 is connected to the connecting line 333. In the present exemplary embodiment, the touch screen panel is a capacitive type so that the change of the capacitance according to the contact position is transmitted to an external driving circuit (not shown) through the sensing pattern 331 and the connecting line 333 when an input object such as a finger or a stylus pen makes contact to the touch screen panel. The change in capacitance may be converted into an electric signal by an input processing circuit (not shown) so that the contact position is acknowledged.

The connecting line 333 is connected to the pad electrode 335. The pad electrode 335 may be exposed by a contact hole formed through the insulating pattern 340. The exposed pad electrode 335 may be electrically connected to a touch driver.

The pad electrode 335 may include a low resistive material or a transparent conductive material. For example, the pad electrode 335 may include molybdenum (Mo), silver (Ag), titanium (Ti), copper (Cu), molybdenum/aluminum/molybdenum (Mo/Al/Mo). However, the present inventive concept is not limited to the above mentioned materials. The pad electrode 335 may include a material substantially the same as the material of the sensing pattern 331. For example, the pad electrode 335 may include indium tin oxide (ITO) or indium zinc oxide (IZO). Alternatively, the pad electrode 335 may include titanium (Ti) or an alloy (MoTi) of molybdenum and titanium.

The pad electrode 335 and the sensing pattern 331 may be formed on a same layer. However, the present inventive concept is not limited thereto. The pad electrode 335 may be formed on a layer different from the layer of the sensing pattern 331. In addition, the pad electrode 335 may include the material different from the material of the sensing pattern 331.

The insulating pattern 340 is disposed on the touch electrode. The insulating pattern 340 covers the touch electrode to insulate the touch electrode. The insulating pattern 340 may prevent the touch electrode from being exposed to water and prevent the touch electrode from corrosion.

The insulating pattern 340 may include an inorganic insulating material. For example, the insulating pattern 340 may include silicon oxide (SiOx) or silicon nitride (SiNx). For example, the insulating pattern 340 may include silicon oxide (SiOx) and have a thickness of 500□. The insulating pattern 340 may have plural layers including different materials.

Referring to FIG. 2, the insulating pattern 340 includes a single layer. The insulating pattern 340 may have a refractive index substantially the same as a refractive index of the sensing pattern 331. For example, the refractive index of the insulating pattern 340 may be equal to or greater than about 1.7 and equal to or less than about 2.2.

The insulating pattern 340 may include a first material having a first refractive index less than the refractive index of the sensing pattern 331 and a second material having a second refractive index greater than the first refractive index. For example, the first material may include silicon oxide (SiOx). The second material may include silicon nitride (SiNx), titanium oxide (TiOx) or niobium oxide (NbOx).

For example, the first refractive index of the first material may be equal to or greater than about 1.4 and equal to or less than about 1.6. The second refractive index of the second material may be equal to or greater than about 1.8 and equal to or less than about 2.3. The insulating pattern 340 may include both the first material and the second material which are mixed and the refractive index of the insulating pattern 340 may be equal to or greater than about 1.7 and equal to or less than about 2.2.

In an exemplary embodiment, the insulating pattern 340 may have a refractive index substantially the same as the refractive index of the sensing pattern 331. Thus the sensing pattern 331 may not be shown to a user.

In an exemplary embodiment, the connecting line 333 and the pad electrode 335 may be formed on a layer same as the sensing pattern 331. The connecting line 333 and the pad electrode 335 may include a material substantially the same as the material of the sensing pattern 331. For example, the connecting line 333 and the pad electrode 335 may include indium tin oxide (ITO) or indium zinc oxide (IZO).

Referring to FIG. 3, the insulating pattern 340 includes two layers. The insulating pattern 340 may have a refractive index substantially the same as a refractive index of the sensing pattern 331. For example, the refractive index of the insulating pattern 340 may be equal to or greater than about 1.7 and equal to or less than about 2.2.

The insulating pattern 340 may include a first sub insulating pattern 341 and a second sub insulating pattern 343.

The first sub insulating pattern 341 has a first refractive index less than the refractive index of the sensing pattern 331 and the second sub insulating pattern 343 has a second refractive index greater than the first refractive index. For example, the first sub insulating pattern 341 may include silicon oxide (SiOx). The second sub insulating pattern 343 may include silicon nitride (SiNx), titanium oxide (TiOx) or niobium oxide (NbOx).

For example, the first refractive index of the first sub insulating pattern 341 may be equal to or greater than about 1.4 and equal to or less than about 1.6. The second refractive index of the second sub insulating pattern 343 may be equal to or greater than about 1.8 and equal to or less than about 2.3. The insulating pattern 340 including the first sub insulating pattern 341 and the second sub insulating pattern 343 which overlap each other may have the refractive index equal to or greater than about 1.7 and equal to or less than about 2.2.

In an exemplary embodiment, the insulating pattern 340 may have a refractive index substantially the same as the refractive index of the sensing pattern 331. Thus the sensing pattern 331 may not be shown to a user.

In an exemplary embodiment, the connecting line 333 and the pad electrode 335 may be formed on a layer same as the sensing pattern 331. The connecting line 333 and the pad electrode 335 may include a material substantially the same as the material of the sensing pattern 331. For example, the connecting line 333 and the pad electrode 335 may include indium tin oxide (ITO) or indium zinc oxide (IZO).

Figure 4:
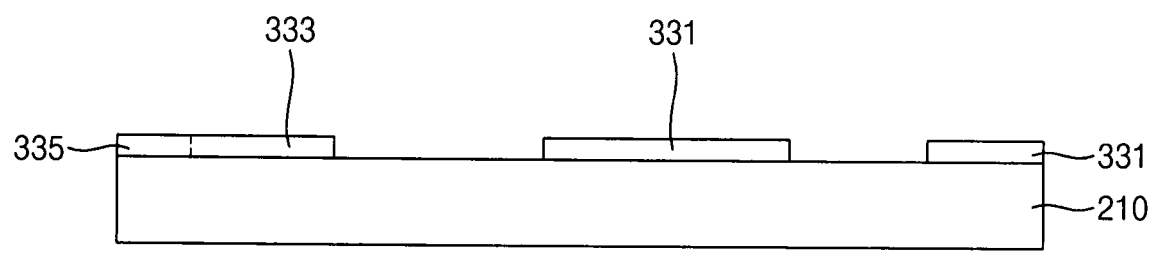
FIGS. 4, 5, and 6 are cross-sectional views illustrating the method of manufacturing a touch electrode of the touch display apparatus of FIGS. 2 and 3.
Figure 5:
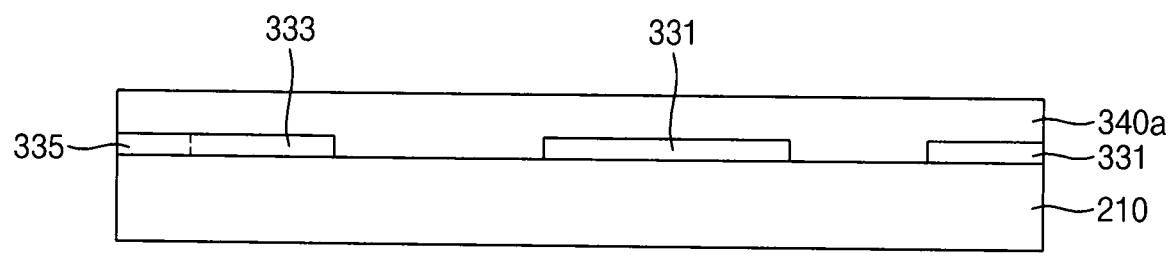
Figure 6:
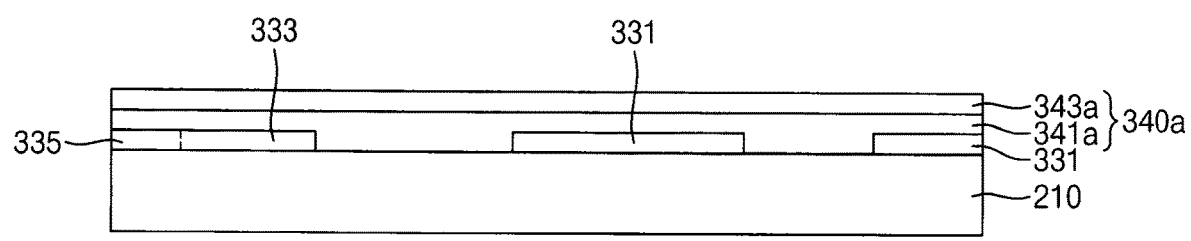

FIGS. 4 to 6 are cross-sectional views illustrating the method of manufacturing the touch electrode of the touch display apparatus of FIGS. 2 and 3.

Referring to FIG. 4, the touch electrode is formed on the color filter substrate 210. The touch electrode may include the sensing pattern 331, the connecting line 333 and the pad electrode 335.

The color filter substrate 210 may be one of a glass substrate, a quartz substrate, a silicon substrate and a plastic substrate.

The sensing pattern 331 may include a transparent conductive material. For example, the sensing pattern 331 may include indium tin oxide (ITO) or indium zinc oxide (IZO). Alternatively, the sensing pattern 331 may include titanium (Ti) or an alloy (MoTi) of molybdenum and titanium.

In addition, the sensing pattern 331 may have a refractive index equal to or greater than about 1.7 and equal to or less than about 2.2. The sensing pattern 331 may have the refractive index substantially the same as a refractive index of the insulating pattern 340.

The connecting line 333 may include a low resistive material or a transparent conductive material. For example, the connecting line 333 may include molybdenum (Mo), silver (Ag), titanium (Ti), copper (Cu), molybdenum/aluminum/molybdenum (Mo/Al/Mo). However, the present inventive concept is not limited to the above mentioned materials. The connecting line 333 may include a material substantially the same as the material of the sensing pattern 331. For example, the connecting line 333 may include indium tin oxide (ITO) or indium zinc oxide (IZO). Alternatively, the connecting line 333 may include titanium (Ti) or an alloy (MoTi) of molybdenum and titanium.

The connecting line 333 and the sensing pattern 331 may be formed on a same layer. However, the present inventive concept is not limited thereto. The connecting line 333 may be formed on a layer different from the layer of the sensing pattern 331. In addition, the connecting line 333 may include the material different from the material of the sensing pattern 331.

The sensing pattern 331 is connected to the connecting line 333. In the present exemplary embodiment, the touch screen panel is a capacitive type so that the change of the capacitance according to the contact position is transmitted to an external driving circuit (not shown) through the sensing pattern 331 and the connecting line 333 when an input object such as a finger or a stylus pen makes contact to the touch screen panel. The change of the capacitance may be converted into an electric signal by an input processing circuit (not shown) so that the contact position is acknowledged.

The connecting line 333 is connected to the pad electrode 335. The pad electrode 335 may be exposed by a contact hole formed through the insulating pattern 340. The exposed pad electrode 335 may be electrically connected to a touch driver.

The pad electrode 335 may include a low resistive material or a transparent conductive material. For example, the pad electrode 335 may include molybdenum (Mo), silver (Ag), titanium (Ti), copper (Cu), molybdenum/aluminum/molybdenum (Mo/Al/Mo). However, the present inventive concept is not limited to the above mentioned materials. The pad electrode 335 may include a material substantially the same as the material of the sensing pattern 331. For example, the pad electrode 335 may include indium tin oxide (ITO) or indium zinc oxide (IZO). Alternatively, the pad electrode 335 may include titanium (Ti) or an alloy (MoTi) of molybdenum and titanium.

The pad electrode 335 and the sensing pattern 331 may be formed on a same layer. However, the present inventive concept is not limited thereto. The pad electrode 335 may be formed on a layer different from the layer of the sensing pattern 331. In addition, the pad electrode 335 may include the material different from the material of the sensing pattern 331.

Referring to FIG. 5, an insulating layer 340a is deposited on the color filter substrate 210 on which the touch electrode is formed.

The insulating layer 340a is deposited on the touch electrode. The insulating layer 340a covers the touch electrode to insulate the touch electrode. The insulating layer 340a may prevent the touch electrode from being exposed to water and prevent the touch electrode from corrosion.

The insulating layer 340a may include an inorganic insulating material. For example, the insulating layer 340a may include silicon oxide (SiOx) or silicon nitride (SiNx). For example, the insulating layer 340a may include silicon oxide (SiOx) and have a thickness of 500□. The insulating layer 340a may have plural layers including different materials.

In the exemplary embodiment, the insulating layer 340a includes a single layer. The insulating layer 340a may have a refractive index substantially the same as a refractive index of the sensing pattern 331. For example, the refractive index of the insulating layer 340a may be equal to or greater than about 1.7 and equal to or less than about 2.2.

The insulating layer 340a may include a first material having a first refractive index less than the refractive index of the sensing pattern 331 and a second material having a second refractive index greater than the first refractive index. For example, the first material may include silicon oxide (SiOx). The second material may include silicon nitride (SiNx), titanium oxide (TiOx) or niobium oxide (NbOx).

For example, the first refractive index of the first material may be equal to or greater than about 1.4 and equal to or less than about 1.6. The second refractive index of the second material may be equal to or greater than about 1.8 and equal to or less than about 2.3. The insulating layer 340a may include both the first material and the second material which are mixed and the refractive index of the insulating layer 340a may be equal to or greater than about 1.7 and equal to or less than about 2.2.

In an exemplary embodiment, the insulating layer 340a may have a refractive index substantially the same as the refractive index of the sensing pattern 331. Thus the sensing pattern 331 may not be shown to a user.

Referring to FIG. 6, the insulating layer 340a is deposited on the color filter substrate 210 on which the touch electrode is formed.

The insulating layer 340a is deposited on the touch electrode. The insulating layer 340a covers the touch electrode to insulate the touch electrode. The insulating layer 340a may prevent the touch electrode from being exposed to water and prevent the touch electrode from corrosion.

The insulating layer 340a may include an inorganic insulating material. For example, the insulating layer 340a may include silicon oxide (SiOx) or silicon nitride (SiNx). For example, the insulating layer 340a may include silicon oxide (SiOx) and have a thickness of 500□. The insulating layer 340a may have plural layers including different materials.

In the present exemplary embodiment, the insulating layer 340a includes two layers. The insulating layer 340a may have a refractive index substantially the same as a refractive index of the sensing pattern 331. For example, the refractive index of the insulating layer 340a may be equal to or greater than about 1.7 and equal to or less than about 2.2.

The insulating layer 340a may include a first sub insulating layer 341a and a second sub insulating layer 343a.

The first sub insulating layer 341a has a first refractive index less than the refractive index of the sensing pattern 331 and the second sub insulating layer 343a has a second refractive index greater than the first refractive index. For example, the first sub insulating layer 341a may include silicon oxide (SiOx). The second sub insulating layer 343a may include silicon nitride (SiNx), titanium oxide (TiOx) or niobium oxide (NbOx).

For example, the first refractive index of the first sub insulating layer 341a may be equal to or greater than about 1.4 and equal to or less than about 1.6. The second refractive index of the second sub insulating layer 343a may be equal to or greater than about 1.8 and equal to or less than about 2.3. The insulating layer 340a including the first sub insulating layer 341a and the second sub insulating layer 343a which overlap each other may have the refractive index equal to or greater than about 1.7 and equal to or less than about 2.2.

In an exemplary embodiment, the insulating pattern 340 may have a refractive index substantially the same as the refractive index of the sensing pattern 331. Thus the sensing pattern 331 may not be shown to a user.

Figure 7:
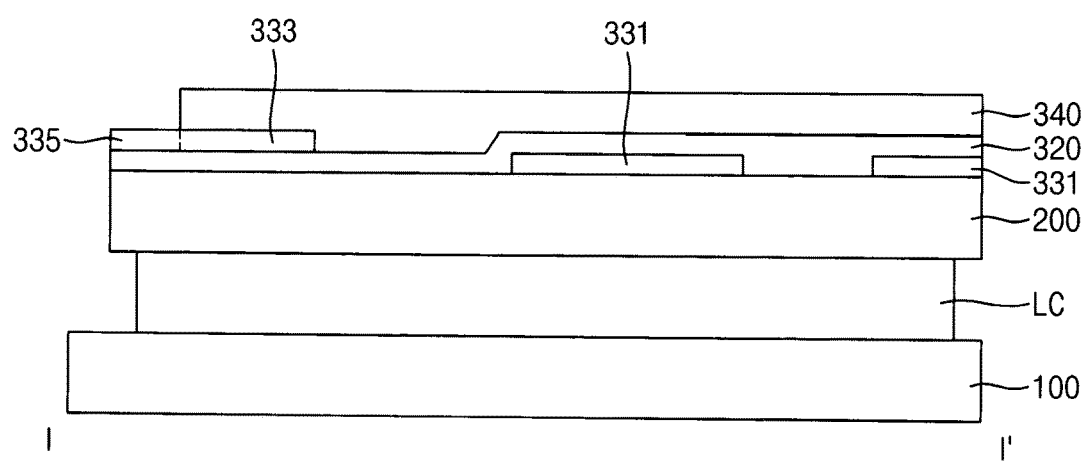
FIG. 7 is a cross-sectional view illustrating the touch display apparatus of FIG. 1 cut along a line I-I'.
Figure 8:
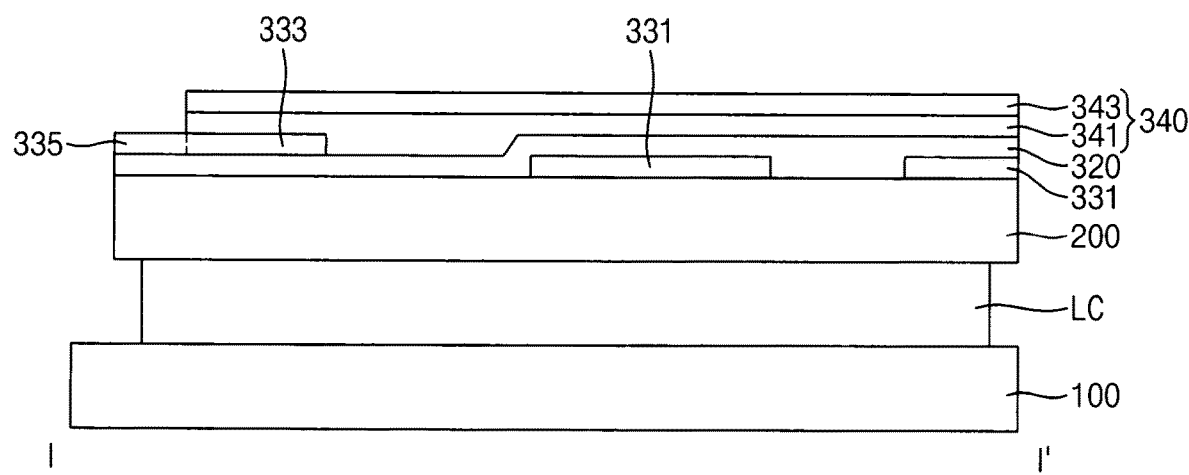
FIG. 8 is a cross-sectional view illustrating the touch display apparatus of FIG. 1 cut along a line I-I'.

FIG. 7 is a cross-sectional view illustrating the touch display apparatus of FIG. 1 cut along a line I-I'. FIG. 8 is a cross-sectional view illustrating the touch display apparatus of FIG. 1 cut along a line I-I'.

Referring to FIG. 7, the insulating pattern 340 includes a single layer. The insulating pattern 340 may have a refractive index substantially the same as a refractive index of the sensing pattern 331. For example, the refractive index of the insulating pattern 340 may be equal to or greater than about 1.7 and equal to or less than about 2.2.

The insulating pattern 340 may include a first material having a first refractive index less than the refractive index of the sensing pattern 331 and a second material having a second refractive index greater than the first refractive index. For example, the first material may include silicon oxide (SiOx). The second material may include silicon nitride (SiNx), titanium oxide (TiOx) or niobium oxide (NbOx).

For example, the first refractive index of the first material may be equal to or greater than about 1.4 and equal to or less than about 1.6. The second refractive index of the second material may be equal to or greater than about 1.8 and equal to or less than about 2.3. The insulating pattern 340 may include both the first material and the second material which are mixed and the refractive index of the insulating pattern 340 may be equal to or greater than about 1.7 and equal to or less than about 2.2.

In an exemplary embodiment, the insulating pattern 340 may have a refractive index substantially the same as the refractive index of the sensing pattern 331. Thus the sensing pattern 331 may not be shown to a user.

In an exemplary embodiment, the connecting line 333 and the pad electrode 335 may be formed on a layer different from the sensing pattern 331. A lower insulating layer 320 is disposed on the connecting line 333 and the pad electrode 335. The connecting line 333 and the pad electrode 335 may include a metal. For example, the connecting line 333 and the pad electrode 335 may include titanium (Ti) or an alloy (MoTi) of molybdenum and titanium. In addition, the sensing pattern 331 may include indium tin oxide (ITO) or indium zinc oxide (IZO).

Referring to FIG. 8, the insulating pattern 340 includes two layers. The insulating pattern 340 may have a refractive index substantially the same as a refractive index of the sensing pattern 331. For example, the refractive index of the insulating pattern 340 may be equal to or greater than about 1.7 and equal to or less than about 2.2.

The insulating pattern 340 may include a first sub insulating pattern 341 and a second sub insulating pattern 343.

The first sub insulating pattern 341 has a first refractive index less than the refractive index of the sensing pattern 331 and the second sub insulating pattern 343 has a second refractive index greater than the first refractive index. For example, the first sub insulating pattern 341 may include silicon oxide (SiOx). The second sub insulating pattern 343 may include silicon nitride (SiNx), titanium oxide (TiOx) or niobium oxide (NbOx).

For example, the first refractive index of the first sub insulating pattern 341 may be equal to or greater than about 1.4 and equal to or less than about 1.6. The second refractive index of the second sub insulating pattern 343 may be equal to or greater than about 1.8 and equal to or less than about 2.3. The insulating pattern 340 including the first sub insulating pattern 341 and the second sub insulating pattern 343 which overlap each other may have the refractive index equal to or greater than about 1.7 and equal to or less than about 2.2.

In an exemplary embodiment, the insulating pattern 340 may have a refractive index substantially the same as the refractive index of the sensing pattern 331. Thus the sensing pattern 331 may not be shown to a user.

In an exemplary embodiment, the connecting line 333 and the pad electrode 335 may be formed on a layer different from the sensing pattern 331. A lower insulating layer 320 is disposed on the connecting line 333 and the pad electrode 335. The connecting line 333 and the pad electrode 335 may include a metal. For example, the connecting line 333 and the pad electrode 335 may include titanium (Ti) or an alloy (MoTi) of molybdenum and titanium. In addition, the sensing pattern 331 may include indium tin oxide (ITO) or indium zinc oxide (IZO).

FIGS. 9 to 13 are cross-sectional views illustrating a method of manufacturing a touch electrode of the touch display apparatus of FIGS. 7 and 8.

Figure 9:
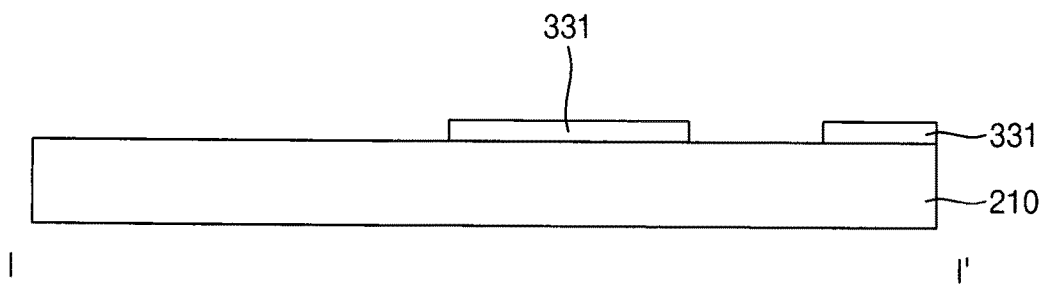
FIGS. 9, 10, 11, 12, and 13 are cross-sectional views illustrating a method of manufacturing a touch electrode of the touch display apparatus of FIGS. 7 and 8.

Referring to FIG. 9, the sensing pattern 331 is formed on the color filter substrate 210.

The color filter substrate 210 may be one of a glass substrate, a quartz substrate, a silicon substrate and a plastic substrate.

The sensing pattern 331 may include a transparent conductive material. For example, the sensing pattern 331 may include indium tin oxide (ITO) or indium zinc oxide (IZO). Alternatively, the sensing pattern 331 may include titanium (Ti) or an alloy (MoTi) of molybdenum and titanium.

In addition, the sensing pattern 331 may have a refractive index equal to or greater than about 1.7 and equal to or less than about 2.2. The sensing pattern 331 may have the refractive index substantially the same as a refractive index of the insulating pattern 340.

Figure 10:
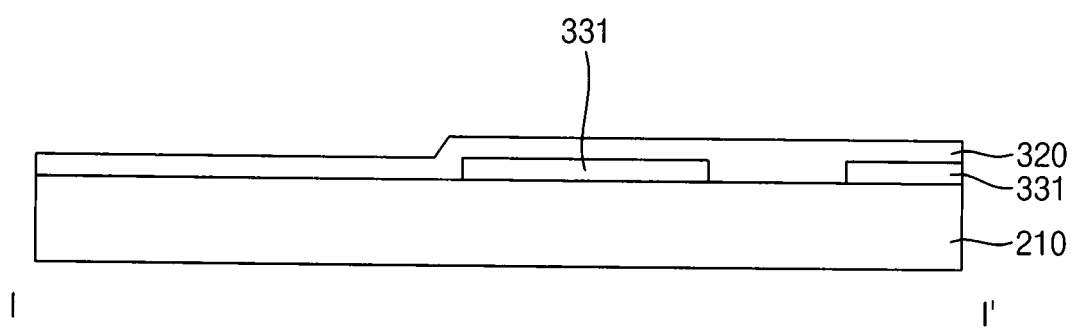

Referring to FIG. 10, the lower insulating layer 320 is formed on the color filter substrate 210 on which the sensing pattern 331 is formed.

The sensing pattern is formed on the lower insulating layer 320. The lower insulating layer 320 covers the sensing pattern 331 to insulate the sensing pattern 331. The lower insulating layer 320 may prevent the sensing pattern 331 from being exposed to water so that the lower insulating layer 320 may prevent the sensing pattern 331 from corrosion.

The lower insulating layer 320 may include an inorganic insulating material. For example, the lower insulating layer 320 may include silicon oxide (SiOx) or silicon nitride (SiNx). For example, the lower insulating layer 320 may include silicon oxide (SiOx) and have a thickness of 500 Å. The lower insulating layer 320 may have plural layers including different materials.

Figure 11:
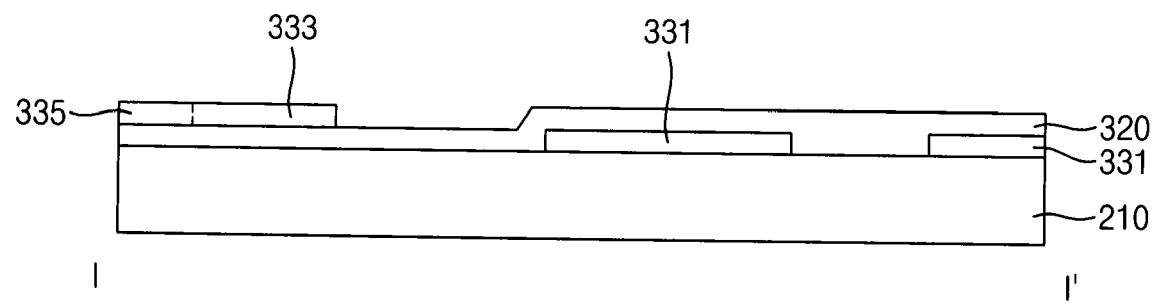

Referring to FIG. 11, the connecting line 333 and the pad electrode 335 may be formed on the color filter substrate 210 on which the lower insulating layer 320 is formed.

The connecting line 333 is connected to the pad electrode 335. The pad electrode 335 may be exposed by a contact hole formed through the insulating pattern 340. The exposed pad electrode 335 may be electrically connected to a touch driver.

The pad electrode 335 may include a low resistive material or a transparent conductive material. For example, the pad electrode 335 may include molybdenum (Mo), silver (Ag), titanium (Ti), copper (Cu), molybdenum/aluminum/ molybdenum (Mo/Al/Mo). However, the present inventive concept is not limited to the above mentioned materials. The pad electrode 335 may include a material substantially the same as the material of the sensing pattern 331. For example, the pad electrode 335 may include indium tin oxide (ITO) or indium zinc oxide (IZO). Alternatively, the pad electrode 335 may include titanium (Ti) or an alloy (MoTi) of molybdenum and titanium.

Figure 12:
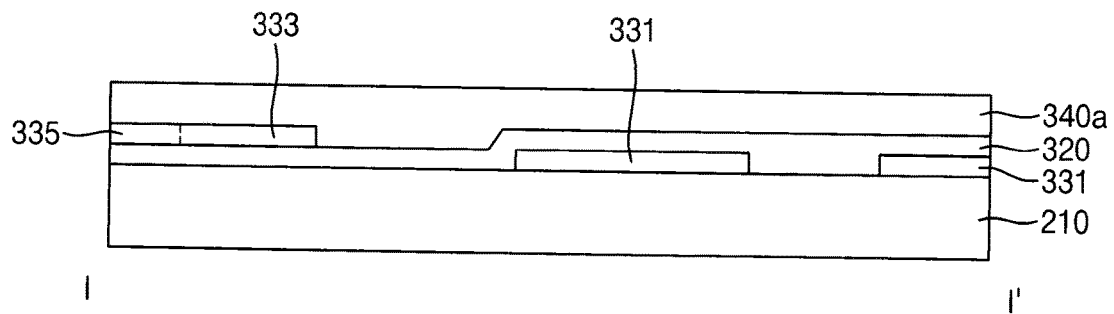

Referring to FIG. 12, the insulating layer 340a is deposited on the color filter substrate 210 on which the connecting line 333 and the pad electrode 335 is formed.

The insulating layer 340a is deposited on the connecting line 333 and the pad electrode 335. The insulating layer 340a covers the connecting line 333 and the pad electrode 335 to insulate the connecting line 333 and the pad electrode 335. The insulating layer 340a may prevent the connecting line 333 and the pad electrode 335 from being exposed to water and prevent the connecting line 333 and the pad electrode 335 from corrosion.

The insulating layer 340a may include an inorganic insulating material. For example, the insulating layer 340a may include silicon oxide (SiOx) or silicon nitride (SiNx). For example, the insulating layer 340a may include silicon oxide (SiOx) and have a thickness of 500 Å. The insulating layer 340a may have plural layers including different materials.

In the exemplary embodiment, the insulating layer 340a includes a single layer. The insulating layer 340a may have a refractive index substantially the same as a refractive index of the sensing pattern 331. For example, the refractive index of the insulating layer 340a may be equal to or greater than about 1.7 and equal to or less than about 2.2.

The insulating layer 340a may include a first material having a first refractive index less than the refractive index of the sensing pattern 331 and a second material having a second refractive index greater than the first refractive index. For example, the first material may include silicon oxide (SiOx). The second material may include silicon nitride (SiNx), titanium oxide (TiOx) or niobium oxide (NbOx).

For example, the first refractive index of the first material may be equal to or greater than about 1.4 and equal to or less than about 1.6. The second refractive index of the second material may be equal to or greater than about 1.8 and equal to or less than about 2.3. The insulating layer 340a may include both the first material and the second material which are mixed and the refractive index of the insulating layer 340a may be equal to or greater than about 1.7 and equal to or less than about 2.2.

In an exemplary embodiment, the insulating layer 340a may have a refractive index substantially the same as the refractive index of the sensing pattern 331. Thus the sensing pattern 331 may not be shown to a user.

Figure 13:
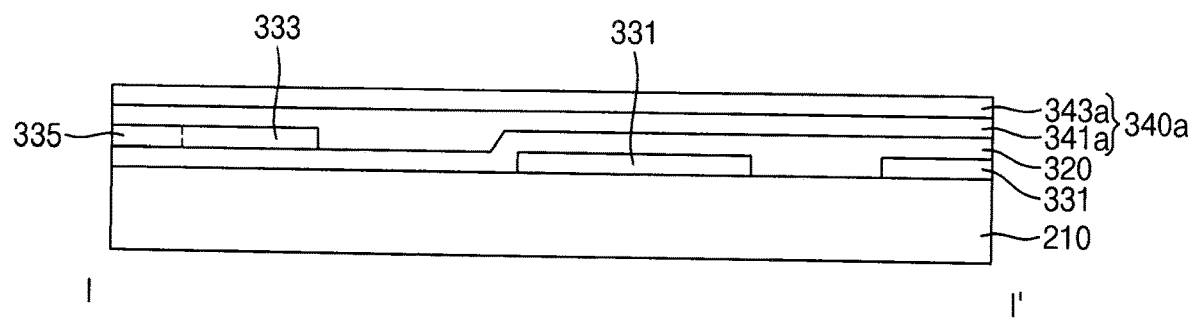

Referring to FIG. 13, the insulating layer 340a is deposited on the color filter substrate 210 on which the connecting line 333 and the pad electrode 335 are formed.

The insulating layer 340a is deposited on the connecting line 333 and the pad electrode 335. The insulating layer 340a covers the connecting line 333 and the pad electrode 335 to insulate the connecting line 333 and the pad electrode 335. The insulating layer 340a may prevent the connecting line 333 and the pad electrode 335 from being exposed to water and prevent the connecting line 333 and the pad electrode 335 from corrosion.

The insulating layer 340a may include an inorganic insulating material. For example, the insulating layer 340a may include silicon oxide (SiOx) or silicon nitride (SiNx). For example, the insulating layer 340a may include silicon oxide (SiOx) and have a thickness of 500 Å. The insulating layer 340a may have plural layers including different materials.

In the present exemplary embodiment, the insulating layer 340a includes two layers. The insulating layer 340a may have a refractive index substantially the same as a refractive index of the sensing pattern 331. For example, the refractive index of the insulating layer 340a may be equal to or greater than about 1.7 and equal to or less than about 2.2.

The insulating layer 340a may include a first sub insulating layer 341a and a second sub insulating layer 343a.

The first sub insulating layer 341a has a first refractive index less than the refractive index of the sensing pattern 331 and the second sub insulating layer 343a has a second refractive index greater than the first refractive index. For example, the first sub insulating layer 341a may include silicon oxide (SiOx). The second sub insulating layer 343a may include silicon nitride (SiNx), titanium oxide (TiOx) or niobium oxide (NbOx).

For example, the first refractive index of the first sub insulating layer 341a may be equal to or greater than about 1.4 and equal to or less than about 1.6. The second refractive index of the second sub insulating layer 343a may be equal to or greater than about 1.8 and equal to or less than about 2.3. The insulating layer 340a including the first sub insulating layer 341a and the second sub insulating layer 343a which overlap each other may have the refractive index equal to or greater than about 1.7 and equal to or less than about 2.2.

In an exemplary embodiment, the insulating pattern 340 may have a refractive index substantially the same as the refractive index of the sensing pattern 331. Thus the sensing pattern 331 may not be seen by a user.

FIG. 14 is a cross-sectional view illustrating a first substrate of FIGS. 2 and 3.

Referring to FIG. 14, the first substrate 100 may include a thin film transistor substrate 110, a gate electrode GE, a source electrode SE, a drain electrode DE, an active pattern AP, a pixel electrode PE, a first insulating layer 120, a second insulating layer 130 and an organic layer 140.

The thin film transistor substrate 110 may include one of a glass substrate, a quartz substrate, a silicon substrate, a plastic substrate and so on.

The gate electrode GE is formed on the thin film transistor substrate 110. The gate electrode GE is electrically connected to a gate line. The gate electrode GE may include copper (Cu), silver (Ag), chromium (Cr), molybdenum (Mo), aluminum (Al), titanium (Ti), manganese (Mn) or an alloy thereof. The gate electrode GE may include a single layer. The gate electrode GE may include plural layers including different metals. For example, the gate electrode GE may include a lower layer including titanium (Ti) and a upper layer disposed on the lower layer and including copper (Cu).

The first insulating layer 120 is formed on the gate electrode GE. The first insulating layer 120 covers the thin film transistor substrate 110 and a first conductive pattern which includes the gate electrode GE. The first insulating layer 120 may include an inorganic insulating material. For example, the first insulating layer 120 may include silicon oxide (SiOx) or silicon nitride (SiNx). For example, the first insulating layer 120 may include silicon oxide (SiOx) and have a thickness of 500 Å. The first insulating layer 120 may have plural layers including different materials.

The active pattern AP is formed on the first insulating layer 120. The active pattern AP is formed on the first insulating layer 120. The active pattern AP is formed in an area where the gate electrode GE is formed. The active pattern AP overlaps the gate electrode GE. The active pattern AP partially overlaps the source electrode SE and the drain electrode DE. The active pattern AP may be disposed between the gate electrode GE and the source electrode SE. The active pattern AP may be disposed between the gate electrode GE and the drain electrode DE.

The source electrode SE and the drain electrode DE are formed on the active pattern AP. The source electrode SE and the drain electrode DE are spaced apart from each other on the active pattern AP. The source electrode SE and the drain electrode DE may be formed on a layer same as a data line.

The source electrode SE and the drain electrode DE may include copper (Cu), silver (Ag), chromium (Cr), molybdenum (Mo), aluminum (Al), titanium (Ti), manganese (Mn) or an alloy thereof. The source electrode SE and the drain electrode DE may include a single layer. The source electrode SE and the drain electrode DE may include plural layers including different metals. For example, the source electrode SE and the drain electrode DE may include a copper (Cu) layer and a titanium (Ti) layer disposed on or under the copper (Cu) layer.

The second insulating layer 130 is formed on the source electrode SE and the drain electrode DE. The second insulating layer 130 may include at least one of a silicon oxide (SiOx) and a silicon nitride (SiNx).

The organic layer 140 is formed on the second insulating layer 130. The organic layer 140 may planarize an upper surface of the first substrate 100 so that a problem due to an uneven upper surface such as a cut off of a signal wiring may be prevented. The organic layer 140 may be an insulating layer including an organic material. The organic layer 140 may be a color filter.

The pixel electrode PE is formed on the organic layer 140. The pixel electrode PE is electrically connected to the drain electrode DE through a contact hole. The pixel electrode PE may include a transparent conductive material. For example, the pixel electrode PE may include indium tin oxide (ITO) or indium zinc oxide (IZO). Alternatively, the pixel electrode PE may include titanium (Ti) or an alloy (MoTi) of molybdenum and titanium.

FIGS. 15 to 19 are cross-sectional views illustrating a method of manufacturing the first substrate of FIG. 14.

Figure 15:
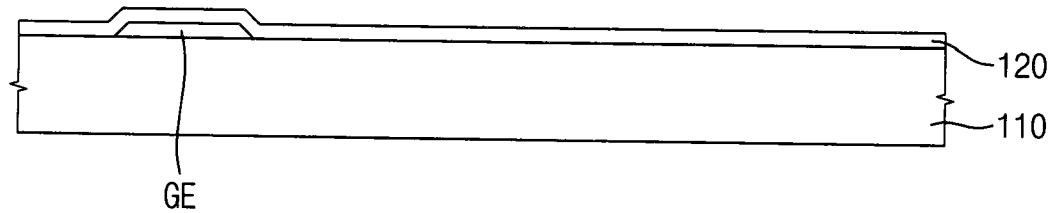
FIGS. 15, 16, 17, 18, and 19 are cross-sectional views illustrating a method of manufacturing the first substrate of FIG. 14.

Referring to FIG. 15, the gate electrode GE and the first insulating layer 120 are formed on the thin film transistor substrate 110.

The gate electrode GE is formed on the thin film transistor substrate 110. The gate electrode GE is electrically connected to a gate line. The gate electrode GE may include copper (Cu), silver (Ag), chromium (Cr), molybdenum (Mo), aluminum (Al), titanium (Ti), manganese (Mn) or an alloy thereof. The gate electrode GE may include a single layer. The gate electrode GE may include plural layers including different metals. For example, the gate electrode GE may include a lower layer including titanium (Ti) and a upper layer disposed on the lower layer and including copper (Cu).

The first insulating layer 120 is formed on the gate electrode GE. The first insulating layer 120 covers the thin film transistor substrate 110 and a first conductive pattern which includes the gate electrode GE. The first insulating layer 120 may include an inorganic insulating material. For example, the first insulating layer 120 may include silicon oxide (SiOx) or silicon nitride (SiNx). For example, the first insulating layer 120 may include silicon oxide (SiOx) and have a thickness of 500 Å. The first insulating layer 120 may have plural layers including different materials.

Figure 16:
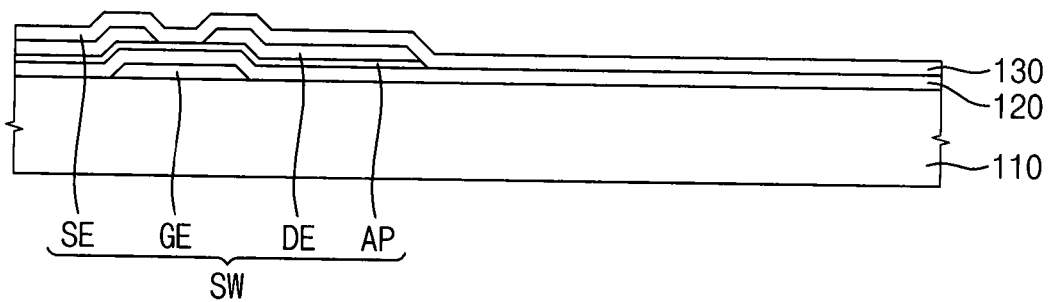

Referring to FIG. 16, the active pattern AP, the source electrode SE, the drain electrode DE and the second insulating layer 130 are formed on the thin film transistor substrate 110 on which the first insulating layer 120 is formed.

The active pattern AP is formed on the first insulating layer 120. The active pattern AP is formed in an area where the gate electrode GE is formed. The active pattern AP overlaps the gate electrode GE. The active pattern AP partially overlaps the source electrode SE and the drain electrode DE. The active pattern AP may be disposed between the gate electrode GE and the source electrode SE. The active pattern AP may be disposed between the gate electrode GE and the drain electrode DE.

The source electrode SE and the drain electrode DE are formed on the active pattern AP. The source electrode SE and the drain electrode DE are spaced apart from each other on the active pattern AP. The source electrode SE and the drain electrode DE may be formed on a layer same as a data line.

The source electrode SE and the drain electrode DE may include copper (Cu), silver (Ag), chromium (Cr), molybdenum (Mo), aluminum (Al), titanium (Ti), manganese (Mn) or an alloy thereof. The source electrode SE and the drain electrode DE may include a single layer. The source electrode SE and the drain electrode DE may include plural layers including different metals. For example, the source electrode SE and the drain electrode DE may include a copper (Cu) layer and a titanium (Ti) layer disposed on or under the copper (Cu) layer.

The second insulating layer 130 is formed on the source electrode SE and the drain electrode DE. The second insulating layer 130 may include at least one of a silicon oxide (SiOx) and a silicon nitride (SiNx).

Figure 17:
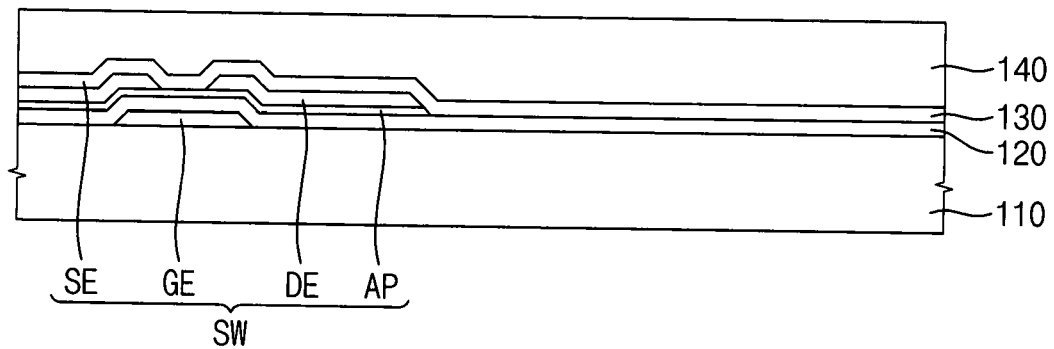

Referring to FIG. 17, the organic layer 140 is formed on the thin film transistor substrate 110 on which the second insulating layer 130 is formed.

The organic layer 140 is formed on the second insulating layer 130. The organic layer 140 may planarize an upper surface of the first substrate 100 so that a problem due to an uneven upper surface such as a cut off of a signal wiring may be prevented. The organic layer 140 may be an insulating layer including an organic material.

Figure 18:
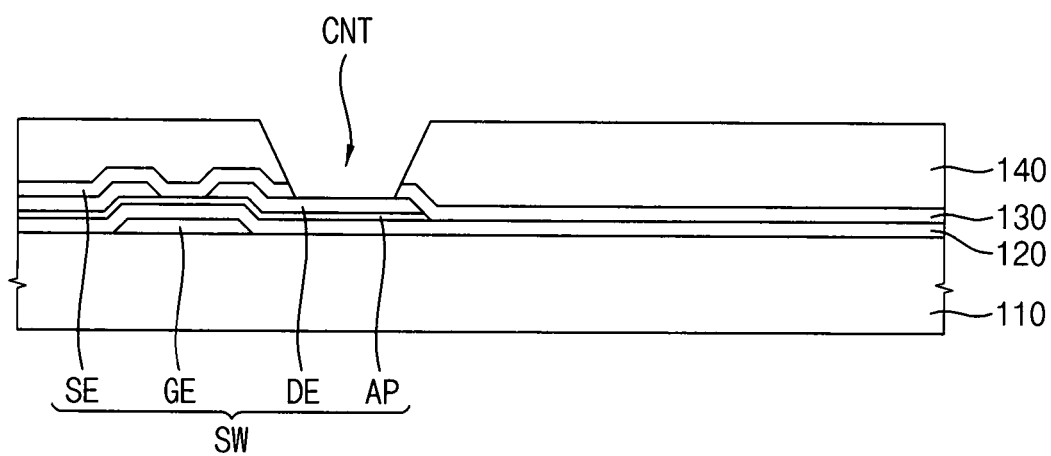

Referring to FIG. 18, a contact hole CNT is formed on the thin film transistor substrate 110 on which the organic layer 140 is formed.

The contact hole CNT may be formed through the organic layer 140 and the second insulating layer 130. The contact hole CNT may expose a portion of the drain electrode DE. The drain electrode DE may be electrically connected to the pixel electrode PE through the contact hole CNT.

Figure 19:
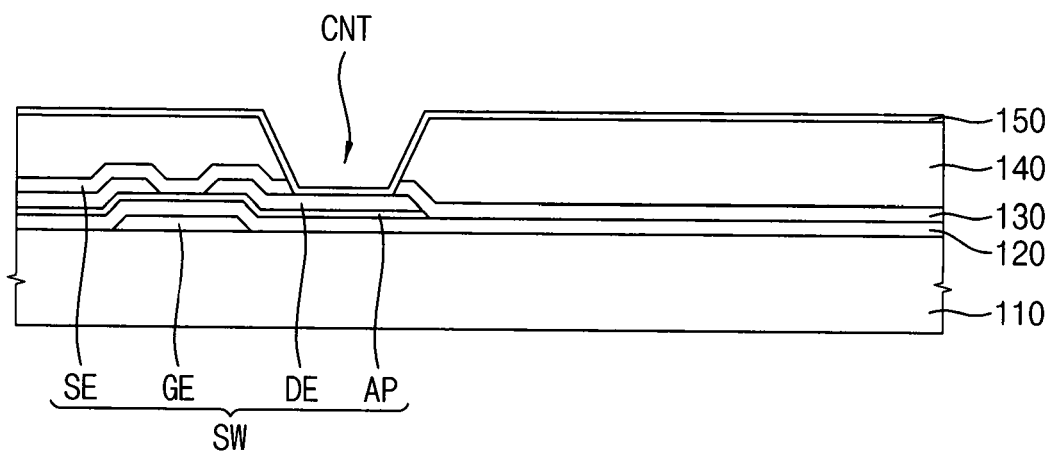

Referring to FIG. 19, a transparent electrode layer 150 is formed on the thin film transistor substrate 110 on which the contact hole CNT is formed.

The transparent electrode layer 150 may include a transparent conductive material. For example, the transparent conductive material may include indium tin oxide (ITO) or indium zinc oxide (IZO). Alternatively, the transparent conductive material may include titanium (Ti) or an alloy (MoTi) of molybdenum and titanium.

Referring to FIG. 14, the transparent conductive material is patterned to form the pixel electrode PE.

The pixel electrode PE is formed on the organic layer 140. The pixel electrode PE is electrically connected to the drain electrode DE through the contact hole CNT (shown in FIG.

18). The pixel electrode PE may include a transparent conductive material. For example, the pixel electrode PE may include indium tin oxide (ITO) or indium zinc oxide (IZO). Alternatively, the pixel electrode PE may include titanium (Ti) or an alloy (MoTi) of molybdenum and titanium.

FIG. 20 is a cross-sectional view illustrating a second substrate of FIG. 2.

Referring to FIG. 20, the touch electrode is formed on a first surface of the color filter substrate 210. The black matrix 220, the color filter 230, the overcoating layer 240 and the common electrode 250 are formed on a second surface of the color filter substrate 210 opposite to the first surface.

The color filter substrate 210 may include a glass substrate, a quartz substrate, a silicon substrate, a plastic substrate and so on.

The black matrix 220 is disposed on the color filter substrate 210. The black matrix 220 is formed in an area where the gate line, the data line, the gate electrode GE, the source electrode SE and the drain electrode DE are disposed. The black matrix 220 corresponds to a peripheral region adjacent to a display region displaying an image. The image may not be displayed on the peripheral region. The black matrix 220 blocks light.

The color filter 230 is disposed on the color filter substrate 210 on which the black matrix 220 is formed. The color filter 230 provides color to the light passing through the liquid crystal layer LC. The color filter 230 may include a red color filter, a green color filter and a blue color filter. The color filter 230 may correspond to a unit pixel. The colors of the color filters 230 corresponding to adjacent unit pixels may be different from each other. The color filter 230 may be overlapped with the adjacent color filter at a boundary area of the adjacent unit pixels. Alternatively, the color filter 230 may be spaced apart from the adjacent color filter.

The overcoating layer 240 is formed on the color filter 230 and the black matrix 220. The overcoating layer 240 planarizes the color filter 230, protects the color filter 230 and insulates the color filter 230. The overcoating layer 240 may include epoxy acrylate element.

The common electrode 250 may be formed on the overcoating layer 240.

The liquid crystal layer LC is disposed between the thin film transistor substrate 110 and the color filter substrate 210. The liquid crystal layer LC includes liquid crystal molecules having an optical anisotropy. The liquid crystal molecules are driven by an electric field such that the liquid crystal molecules transmit or block light passing through the liquid crystal layer LC to display an image.

In addition, the touch display apparatus may further include a light source part disposed under a display panel or disposed in a side of the display panel.

The touch electrode may include a sensing pattern 331, a connecting line 333 and a pad electrode 335.

The sensing pattern 331 may include a transparent conductive material. For example, the sensing pattern 331 may include indium tin oxide (ITO) or indium zinc oxide (IZO). Alternatively, the sensing pattern 331 may include titanium (Ti) or an alloy (MoTi) of molybdenum and titanium.

In addition, the sensing pattern 331 may have a refractive index equal to or greater than about 1.7 and equal to or less than about 2.2. The sensing pattern 331 may have the refractive index substantially the same as a refractive index of the insulating pattern 340.

The connecting line 333 may include a low resistive material or a transparent conductive material. For example, the connecting line 333 may include molybdenum (Mo), silver (Ag), titanium (Ti), copper (Cu), molybdenum/aluminum/molybdenum (Mo/Al/Mo). However, the present inventive concept is not limited to the above mentioned materials. The connecting line 333 may include a material substantially the same as the material of the sensing pattern 331. For example, the connecting line 333 may include indium tin oxide (ITO) or indium zinc oxide (IZO). Alternatively, the connecting line 333 may include titanium (Ti) or an alloy (MoTi) of molybdenum and titanium.

The connecting line 333 and the sensing pattern 331 may be formed on a same layer. However, the present inventive concept is not limited thereto. The connecting line 333 may be formed on a layer different from the layer of the sensing pattern 331. In addition, the connecting line 333 may include the material different from the material of the sensing pattern 331.

The sensing pattern 331 is connected to the connecting line 333. In the present exemplary embodiment, the touch screen panel is a capacitive type so that the change of the capacitance according to the contact position is transmitted to an external driving circuit (not shown) through the sensing pattern 331 and the connecting line 333 when an input object such as a finger or a stylus pen makes contact to the touch screen panel. The change of the capacitance may be converted into an electric signal by an input processing circuit (not shown) so that the contact position is acknowledged.

The connecting line 333 is connected to the pad electrode 335. The pad electrode 335 may be exposed by a contact hole formed through the insulating pattern 340. The exposed pad electrode 335 may be electrically connected to a touch driver.

The pad electrode 335 may include a low resistive material or a transparent conductive material. For example, the pad electrode 335 may include molybdenum (Mo), silver (Ag), titanium (Ti), copper (Cu), molybdenum/aluminum/molybdenum (Mo/Al/Mo). However, the present inventive concept is not limited to the above mentioned materials. The pad electrode 335 may include a material substantially the same as the material of the sensing pattern 331. For example, the pad electrode 335 may include indium tin oxide (ITO) or indium zinc oxide (IZO). Alternatively, the pad electrode 335 may include titanium (Ti) or an alloy (MoTi) of molybdenum and titanium.

The pad electrode 335 and the sensing pattern 331 may be formed on a same layer. However, the present inventive concept is not limited thereto. The pad electrode 335 may be formed on a layer different from the layer of the sensing pattern 331. In addition, the pad electrode 335 may include the material different from the material of the sensing pattern 331.

The insulating pattern 340 is disposed on the touch electrode. The insulating pattern 340 covers the touch electrode to insulate the touch electrode. The insulating pattern 340 may prevent the touch electrode from being exposed to water and prevent the touch electrode from corrosion.

The insulating pattern 340 may include an inorganic insulating material. For example, the insulating pattern 340 may include silicon oxide (SiOx) or silicon nitride (SiNx). For example, the insulating pattern 340 may include silicon oxide (SiOx) and have a thickness of 50058 . The insulating pattern 340 may have plural layers including different materials.

The insulating pattern 340 includes a single layer. The insulating pattern 340 may have a refractive index substantially the same as a refractive index of the sensing pattern 331. For example, the refractive index of the insulating pattern 340 may be equal to or greater than about 1.7 and equal to or less than about 2.2.

The insulating pattern 340 may include a first material having a first refractive index less than the refractive index of the sensing pattern 331 and a second material having a second refractive index greater than the first refractive index. For example, the first material may include silicon oxide (SiOx). The second material may include silicon nitride (SiNx), titanium oxide (TiOx) or niobium oxide (NbOx).

For example, the first refractive index of the first material may be equal to or greater than about 1.4 and equal to or less than about 1.6. The second refractive index of the second material may be equal to or greater than about 1.8 and equal to or less than about 2.3. The insulating pattern 340 may include both the first material and the second material which are mixed and the refractive index of the insulating pattern 340 may be equal to or greater than about 1.7 and equal to or less than about 2.2.

Figure 21:
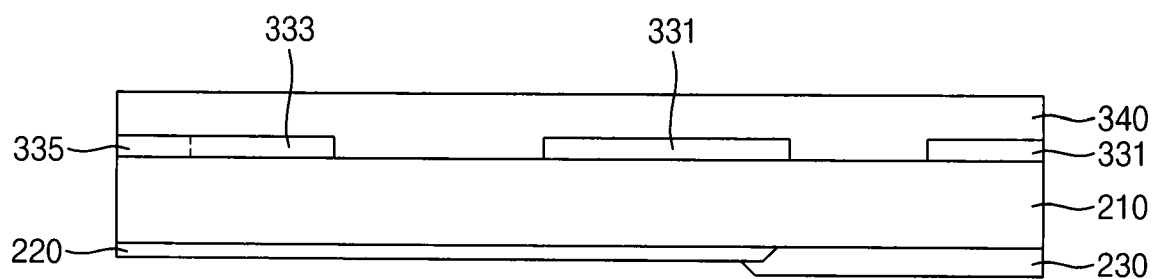
FIGS. 21 and 22 are cross-sectional views illustrating a method of manufacturing the second substrate of FIG. 20.
Figure 22:
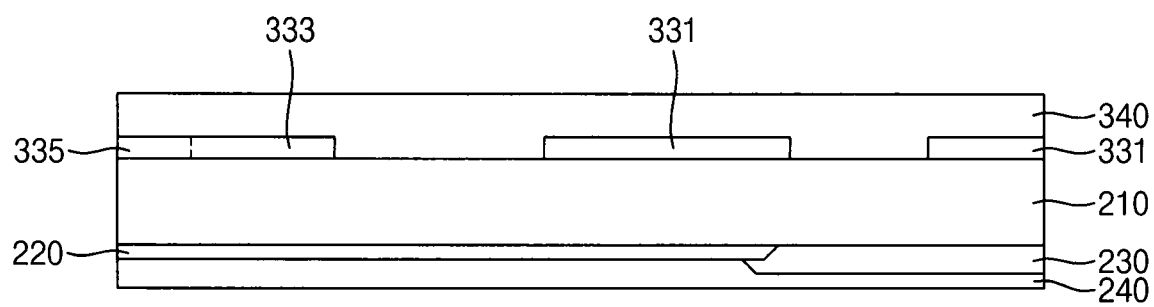

FIGS. 21 and 22 are cross-sectional views illustrating a method of manufacturing the second substrate of FIG. 20.

Referring to FIG. 21, the black matrix 220 and the color filter 230 are formed on the second surface of the color filter substrate 210 opposite to the first surface on which the touch electrode is formed.

The black matrix 220 is disposed on the color filter substrate 210. The black matrix 220 is formed in an area where the gate line, the data line, the gate electrode GE, the source electrode SE and the drain electrode DE are disposed. The black matrix 220 corresponds to a peripheral region adjacent to a display region displaying an image. The image may not be displayed on the peripheral region. The black matrix 220 blocks light.

The color filter 230 is disposed on the color filter substrate 210 on which the black matrix 220 is formed. The color filter 230 provides color to the light passing through the liquid crystal layer LC. The color filter 230 may include a red color filter, a green color filter and a blue color filter. The color filter 230 may correspond to a unit pixel. The colors of the color filters 230 corresponding to adjacent unit pixels may be different from each other. The color filter 230 may be overlapped with the adjacent color filter at a boundary area of the adjacent unit pixels. Alternatively, the color filter 230 may be spaced apart from the adjacent color filter.

Referring to FIG. 22, the overcoating layer 240 is formed on the second surface of the color filter substrate 210 on which the black matrix 220 and the color filter 230 are formed.

The overcoating layer 240 is formed on the color filter 230 and the black matrix 220. The overcoating layer 240 planarizes the color filter 230, protects the color filter 230 and insulates the color filter 230. The overcoating layer 240 may include epoxy acrylate element.

Referring to FIG. 20, the common electrode is formed on the second surface of the color filter substrate 210 on which the overcoating layer 240 is formed.

The common electrode 250 may be formed on the overcoating layer 240. The common electrode 250 may include a transparent conductive material. For example, the common electrode 250 may include indium tin oxide (ITO) or indium zinc oxide (IZO). Alternatively, the common electrode 250 may include titanium (Ti) or an alloy (MoTi) of molybdenum and titanium.

Figure 23:
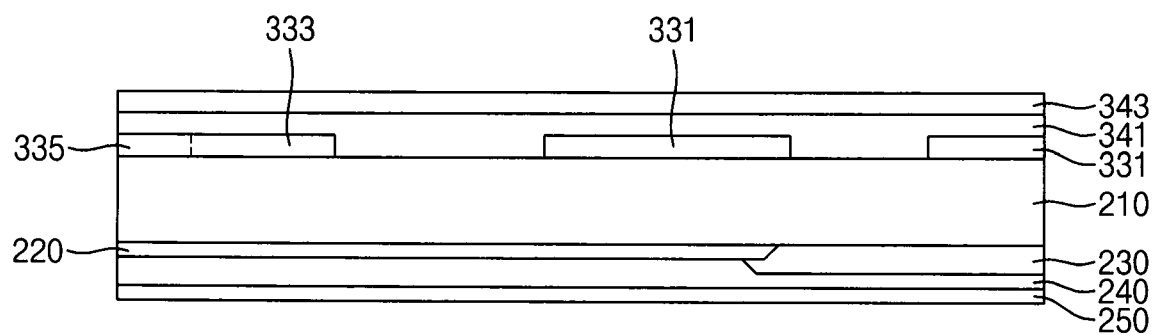
FIG. 23 is a cross-sectional view illustrating a second substrate of FIG. 3.

FIG. 23 is a cross-sectional view illustrating a second substrate of FIG. 3.

Referring to FIG. 23, the touch electrode is formed on a first surface of the color filter substrate 210. The black matrix 220, the color filter 230, the overcoating layer 240 and the common electrode 250 are formed on a second surface of the color filter substrate 210 opposite to the first surface.

The color filter substrate 210 may include a glass substrate, a quartz substrate, a silicon substrate, a plastic substrate and so on.

The black matrix 220 is disposed on the color filter substrate 210. The black matrix 220 is formed in an area where the gate line, the data line, the gate electrode GE, the source electrode SE and the drain electrode DE are disposed. The black matrix 220 corresponds to a peripheral region adjacent to a display region displaying an image. The image may not be displayed on the peripheral region. The black matrix 220 blocks light.

The color filter 230 is disposed on the color filter substrate 210 on which the black matrix 220 is formed. The color filter 230 provides color to the light passing through the liquid crystal layer LC. The color filter 230 may include a red color filter, a green color filter and a blue color filter. The color filter 230 may correspond to a unit pixel. The colors of the color filters 230 corresponding to adjacent unit pixels may be different from each other. The color filter 230 may be overlapped with the adjacent color filter at a boundary area of the adjacent unit pixels. Alternatively, the color filter 230 may be spaced apart from the adjacent color filter.

The overcoating layer 240 is formed on the color filter 230 and the black matrix 220. The overcoating layer 240 planarizes the color filter 230, protects the color filter 230 and insulates the color filter 230. The overcoating layer 240 may include epoxy acrylate element.

The common electrode 250 may be formed on the overcoating layer 240.

The liquid crystal layer LC is disposed between the thin film transistor substrate 110 and the color filter substrate 210. The liquid crystal layer LC includes liquid crystal molecules having an optical anisotropy. The liquid crystal molecules are driven by an electric field such that the liquid crystal molecules transmit or block light passing through the liquid crystal layer LC to display an image.

In addition, the touch display apparatus may further include a light source part disposed under a display panel or disposed in a side of the display panel.

The touch electrode may include a sensing pattern 331, a connecting line 333 and a pad electrode 335.

The sensing pattern 331 may include a transparent conductive material. For example, the sensing pattern 331 may include indium tin oxide (ITO) or indium zinc oxide (IZO). Alternatively, the sensing pattern 331 may include titanium (Ti) or an alloy (MoTi) of molybdenum and titanium.

In addition, the sensing pattern 331 may have a refractive index equal to or greater than about 1.7 and equal to or less than about 2.2. The sensing pattern 331 may have the refractive index substantially the same as a refractive index of the insulating pattern 340.

The connecting line 333 may include a low resistive material or a transparent conductive material. For example, the connecting line 333 may include molybdenum (Mo), silver (Ag), titanium (Ti), copper (Cu), molybdenum/aluminum/molybdenum (Mo/Al/Mo). However, the present inventive concept is not limited to the above mentioned materials. The connecting line 333 may include a material substantially the same as the material of the sensing pattern 331. For example, the connecting line 333 may include indium tin oxide (ITO) or indium zinc oxide (IZO). Alternatively, the connecting line 333 may include titanium (Ti) or an alloy (MoTi) of molybdenum and titanium.

The connecting line 333 and the sensing pattern 331 may be formed on a same layer. However, the present inventive concept is not limited thereto. The connecting line 333 may be formed on a layer different from the layer of the sensing pattern 331. In addition, the connecting line 333 may include the material different from the material of the sensing pattern 331.

The sensing pattern 331 is connected to the connecting line 333. In the present exemplary embodiment, the touch screen panel is a capacitive type so that the change of the capacitance according to the contact position is transmitted to an external driving circuit (not shown) through the sensing pattern 331 and the connecting line 333 when an input object such as a finger or a stylus pen makes contact to the touch screen panel. The change of the capacitance may be converted into an electric signal by an input processing circuit (not shown) so that the contact position is acknowledged.

The connecting line 333 is connected to the pad electrode 335. The pad electrode 335 may be exposed by a contact hole formed through the insulating pattern 340. The exposed pad electrode 335 may be electrically connected to a touch driver.

The pad electrode 335 may include a low resistive material or a transparent conductive material. For example, the pad electrode 335 may include molybdenum (Mo), silver (Ag), titanium (Ti), copper (Cu), molybdenum/aluminum/molybdenum (Mo/Al/Mo). However, the present inventive concept is not limited to the above mentioned materials. The pad electrode 335 may include a material substantially the same as the material of the sensing pattern 331. For example, the pad electrode 335 may include indium tin oxide (ITO) or indium zinc oxide (IZO). Alternatively, the pad electrode 335 may include titanium (Ti) or an alloy (MoTi) of molybdenum and titanium.

The pad electrode 335 and the sensing pattern 331 may be formed on a same layer. However, the present inventive concept is not limited thereto. The pad electrode 335 may be formed on a layer different from the layer of the sensing pattern 331. In addition, the pad electrode 335 may include the material different from the material of the sensing pattern 331.

The insulating pattern 340 is disposed on the touch electrode. The insulating pattern 340 covers the touch electrode to insulate the touch electrode. The insulating pattern 340 may prevent the touch electrode from being exposed to water and prevent the touch electrode from corrosion.

The insulating pattern 340 may include an inorganic insulating material. For example, the insulating pattern 340 may include silicon oxide (SiOx) or silicon nitride (SiNx). For example, the insulating pattern 340 may include silicon oxide (SiOx) and have a thickness of 500□. The insulating pattern 340 may have plural layers including different materials.

The insulating pattern 340 includes two layers. The insulating pattern 340 may have a refractive index substantially the same as a refractive index of the sensing pattern 331. For example, the refractive index of the insulating pattern 340 may be equal to or greater than about 1.7 and equal to or less than about 2.2.

The insulating pattern 340 may include a first sub insulating pattern 341 and a second sub insulating pattern 343.

The first sub insulating pattern 341 has a first refractive index less than the refractive index of the sensing pattern 331 and the second sub insulating pattern 343 has a second refractive index greater than the first refractive index. For example, the first sub insulating pattern 341 may include silicon oxide (SiOx). The second sub insulating pattern 343 may include silicon nitride (SiNx), titanium oxide (TiOx) or niobium oxide (NbOx).

For example, the first refractive index of the first sub insulating pattern 341 may be equal to or greater than about 1.4 and equal to or less than about 1.6. The second refractive index of the second sub insulating pattern 343 may be equal to or greater than about 1.8 and equal to or less than about 2.3. The insulating pattern 340 including the first sub insulating pattern 341 and the second sub insulating pattern 343 which overlap each other may have the refractive index equal to or greater than about 1.7 and equal to or less than about 2.2.

Figure 24:
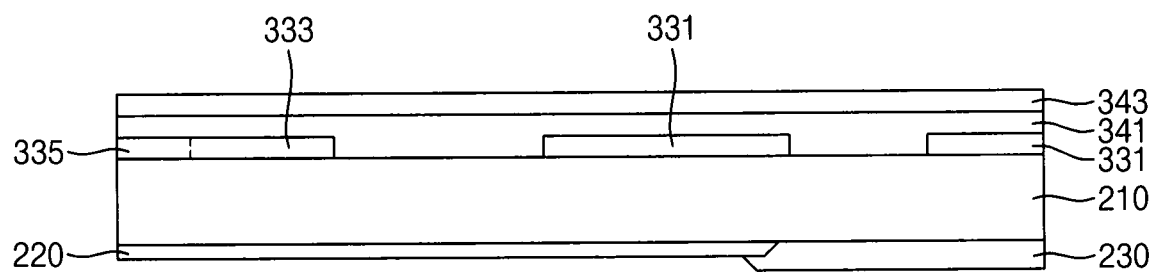
FIGS. 24 and 25 are cross-sectional views illustrating a method of manufacturing the second substrate of FIG. 23.
Figure 25:
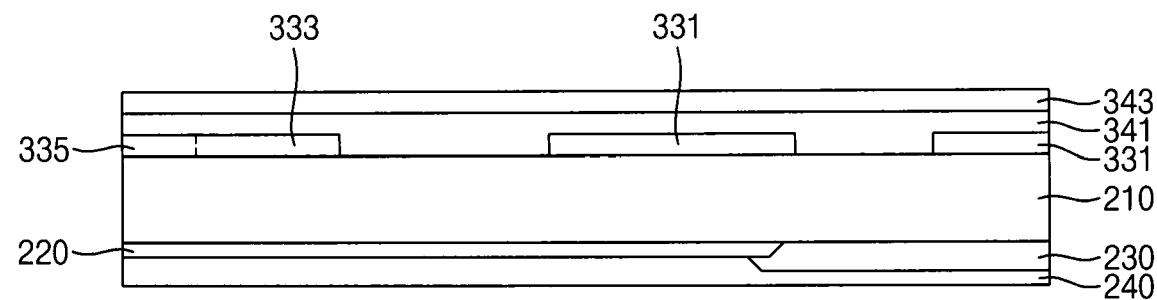

FIGS. 24 and 25 are cross-sectional views illustrating a method of manufacturing the second substrate of FIG. 23.

Referring to FIG. 24, the black matrix 220 and the color filter 230 are formed on the second surface of the color filter substrate 210 opposite to the first surface on which the touch electrode is formed.

The black matrix 220 is disposed on the color filter substrate 210. The black matrix 220 is formed in an area where the gate line, the data line, the gate electrode GE, the source electrode SE and the drain electrode DE are disposed. The black matrix 220 corresponds to a peripheral region adjacent to a display region displaying an image. The image may not be displayed on the peripheral region. The black matrix 220 blocks light.

The color filter 230 is disposed on the color filter substrate 210 on which the black matrix 220 is formed. The color filter 230 provides color to the light passing through the liquid crystal layer LC. The color filter 230 may include a red color filter, a green color filter and a blue color filter. The color filter 230 may correspond to a unit pixel. The colors of the color filters 230 corresponding to adjacent unit pixels may be different from each other. The color filter 230 may be overlapped with the adjacent color filter at a boundary area of the adjacent unit pixels. Alternatively, the color filter 230 may be spaced apart from the adjacent color filter.

Referring to FIG. 25, the overcoating layer 240 is formed on the color filter substrate 210 on which the black matrix 220 and the color filter 230 are formed.

The overcoating layer 240 is formed on the color filter 230 and the black matrix 220. The overcoating layer 240 planarizes the color filter 230, protects the color filter 230 and insulates the color filter 230. The overcoating layer 240 may include epoxy acrylate element.

Referring to FIG. 23, the common electrode 250 is formed on the color filter substrate 210 on which the overcoating layer 240 is formed.

The common electrode 250 may be formed on the overcoating layer 240. The common electrode 250 may include a transparent conductive material. For example, the common electrode 250 may include indium tin oxide (ITO) or indium zinc oxide (IZO). Alternatively, the common electrode 250 may include titanium (Ti) or an alloy (MoTi) of molybdenum and titanium.

Figure 26:
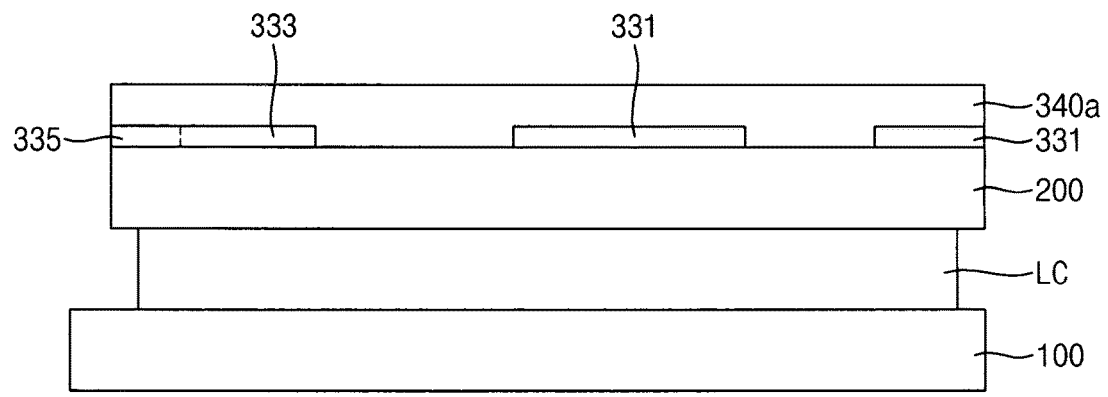
FIG. 26 is a cross-sectional view illustrating a method of manufacturing the touch display apparatus of FIG. 2.

FIG. 26 is a cross-sectional view illustrating a method of manufacturing the touch display apparatus of FIG. 2.

Referring to FIG. 26, the liquid crystal layer LC is disposed between the first substrate 100 and the second substrate 200.

The liquid crystal layer LC is disposed between the thin film transistor substrate 110 and the color filter substrate 210. The liquid crystal layer LC includes liquid crystal molecules having an optical anisotropy. The liquid crystal molecules are driven by an electric field such that the liquid crystal molecules transmit or block light passing through the liquid crystal layer LC to display an image.

Referring to FIG. 2, the insulating layer 340a is patterned to form the insulating pattern 340.

The insulating pattern 340 may expose a portion of the drain electrode DE.

In an exemplary embodiment, the insulating layer 340a may be patterned to form the insulating pattern 340 after the liquid crystal layer 300 is formed between the first substrate 100 and the second substrate 200.

If the insulating layer 340a is patterned prior to forming the liquid crystal layer 300 between the first substrate 100 and the second substrate 200, the exposed touch electrode may be damaged during a manufacturing process.

In contrast, the insulating layer 340a is patterned to form the insulating pattern 340 after the liquid crystal layer 300 is formed between the first substrate 100 and the second substrate 200 so that the touch electrode may be prevented from damage during the manufacturing process. In addition, in a process of forming the liquid crystal layer 300 and in a process of patterning the insulating layer 340a, heat may be generated so that the touch electrode may be heat treated. Thus, the conductive transparent material in the touch electrode may be crystallized so that resistance and optical characteristics of the touch electrode may be improved.

Figure 27:
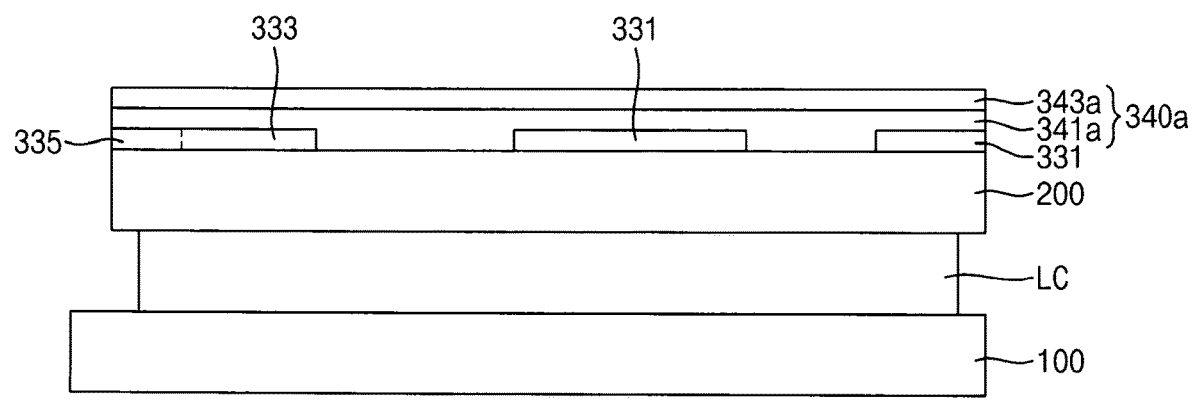
FIG. 27 is a cross-sectional view illustrating a method of manufacturing the touch display apparatus of FIG. 3.

FIG. 27 is a cross-sectional view illustrating a method of manufacturing the touch display apparatus of FIG. 3.

Referring to FIG. 27, the liquid crystal layer LC is disposed between the first substrate 100 and the second substrate 200.

The liquid crystal layer LC is disposed between the thin film transistor substrate 110 and the color filter substrate 210. The liquid crystal layer LC includes liquid crystal molecules having an optical anisotropy. The liquid crystal molecules are driven by an electric field such that the liquid crystal molecules transmit or block light passing through the liquid crystal layer LC to display an image.

Referring to FIG. 3, the first sub insulating layer 341a and the second sub insulating layer 343a are patterned to form the first sub insulating pattern 341 and the second sub insulating pattern 343.

The first sub insulating pattern 341 and the second sub insulating pattern 343 may expose a portion of the drain electrode DE.

In an exemplary embodiment, the insulating layer 340a may be patterned to form the first sub insulating pattern 341 and the second sub insulating pattern 343 after the liquid crystal layer 300 is formed between the first substrate 100 and the second substrate 200.

If the first sub insulating layer 341a and the second sub insulating pattern 343a are patterned prior to forming the liquid crystal layer 300 between the first substrate 100 and the second substrate 200, the exposed touch electrode may be damaged during a manufacturing process.

In contrast, the first sub insulating layer 341a and the second sub insulating pattern 343a are patterned to form the first sub insulating pattern 341 and the second sub insulating pattern 343 after the liquid crystal layer 300 is formed between the first substrate 100 and the second substrate 200 so that the touch electrode may be prevented from damage during the manufacturing process. In addition, in a process of forming the liquid crystal layer 300 and in a process of patterning the first sub insulating layer 341a and the second sub insulating pattern 343a, heat may be generated so that the touch electrode may be heat treated. Thus, the conductive transparent material in the touch electrode may be crystallized so that resistance and optical characteristics of the touch electrode may be improved.

Figure 28:
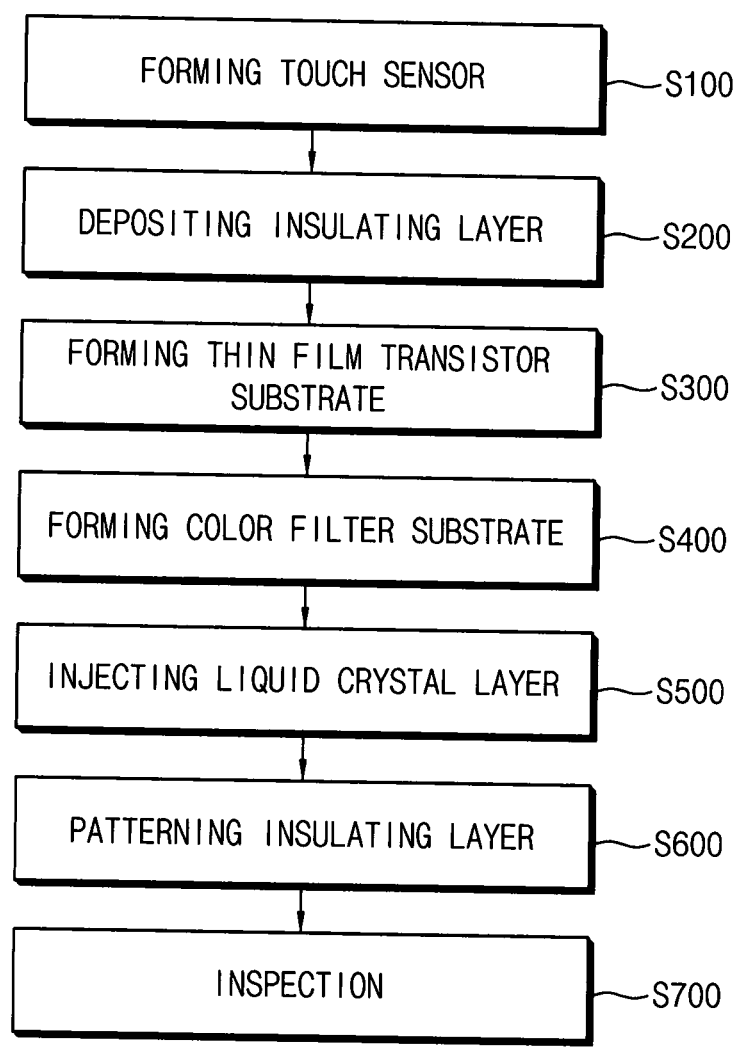
FIG. 28 is a flowchart illustrating a method of manufacturing the touch display apparatus according to an exemplary embodiment of the present inventive concept.

FIG. 28 is a flowchart illustrating a method of manufacturing the touch display apparatus according to an exemplary embodiment of the present inventive concept.

Referring to FIG. 28, the method of manufacturing the touch display apparatus according to an exemplary embodiment of the present inventive concept includes forming a touch electrode (step S100), depositing an insulating layer (step S200), forming a first substrate (step S300), forming a second substrate (step S400), forming a liquid crystal layer (step S500), patterning the insulating layer (step S600) and inspecting the touch display apparatus (step S700).

In the present exemplary embodiment, the insulating layer may be patterned to form the insulating pattern after the liquid crystal layer is formed between the first substrate and the second substrate.

If the insulating layer 340a is patterned prior to forming the liquid crystal layer 300 between the first substrate 100 and the second substrate 200, the exposed touch electrode may be damaged during a manufacturing process.

In contrast, the insulating layer 340a is patterned to form the insulating pattern 340 after the liquid crystal layer 300 is formed between the first substrate 100 and the second substrate 200 so that the touch electrode may be prevented from damage during the manufacturing process. In addition, in a process of forming the liquid crystal layer 300 and in a process of patterning the insulating layer 340a, heat may be generated so that the touch electrode may be heat treated. Thus, the conductive transparent material in the touch electrode may be crystallized so that resistance and optical characteristics of the touch electrode may be improved.

According to the present exemplary embodiment, after the liquid crystal layer is formed between the first substrate and the second substrate, the insulating layer is patterned to form the insulating pattern. Thus, the touch electrode is prevented from being damaged in the manufacturing steps. In addition, heat treatment may be applied to the touch electrode by heat generated in a step of forming the liquid crystal layer and in a step of patterning the insulating layer. Thus, resistive characteristics and optical characteristics of the touch electrode may be improved due to crystallization of a transparent conductive material of the touch electrode by the heat treatment.

In addition, the refractive index of the insulating pattern of the touch display apparatus may be substantially the same as the refractive index of the touch electrode so that the touch electrode may not be shown to a user.

The foregoing is illustrative of the present inventive concept and is not to be construed as limiting thereof. Although a few exemplary embodiments of the present inventive concept have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific exemplary embodiments disclosed, and that modifications to the disclosed exemplary embodiments, as well as other exemplary embodiments, are intended to be included within the scope of the appended claims. The present inventive concept is defined by the following claims, with equivalents of the claims to be included therein.

What is claimed is:

1. A touch display apparatus comprising:
   a first substrate;
   a touch electrode disposed on a first surface of the first substrate;
   an insulating pattern disposed on the touch electrode, wherein the insulating pattern comprises a first sub insulating pattern and a second sub insulating pattern on the first sub insulating pattern, wherein the first sub insulating pattern has a first refractive index less than a refractive index of the touch electrode, wherein the second sub insulating pattern has a second refractive index greater than the first refractive index, and wherein the first sub insulating pattern directly contacts the touch electrode and directly contacts the second sub insulating pattern;
   a second substrate facing a second surface of the first substrate opposite the first surface of the first substrate; and
   a liquid crystal layer disposed between the first substrate and the second substrate,
   wherein the refractive index of the touch electrode is greater than the first refractive index and less than the second refractive index so that a refractive index of the insulating pattern is substantially the same as the refractive index of the touch electrode.

2. The touch display apparatus of claim 1, wherein the touch electrode comprises a transparent conductive material, and wherein a refractive index of the insulating pattern is substantially equal to the refractive index of the touch electrode.

3. The touch display apparatus of claim 1, wherein the touch electrode includes a pad electrode, and wherein the pad electrode protrudes beyond the second sub insulating pattern in a direction parallel to the first surface of the first substrate.

4. The touch display apparatus of claim 1, wherein the refractive index of the touch electrode is equal to or greater than about 1.7 and equal to or less than about 2.2.

5. The touch display apparatus of claim 1, wherein the first refractive index is equal to or greater than about 1.4 and equal to or less than about 1.6, and
   the second refractive index is equal to or greater than about 1.8 and equal to or less than about 2.3.

6. The touch display apparatus of claim 1, wherein the first sub insulating pattern includes silicon oxide (SiOx), and
   the second sub insulating pattern includes silicon nitride (SiNx), titanium oxide (TiOx) or niobium oxide (NbOx).

7. The touch display apparatus of claim 1, wherein the insulating pattern comprises:
   a first material having the first refractive index; and
   a second material having the second refractive index.

8. The touch display apparatus of claim 7, wherein the first refractive index of the first material is equal to or greater than about 1.4 and equal to or less than about 1.6, and
   the second refractive index of the second material is equal to or greater than about 1.8 and equal to or less than about 2.3.

9. The touch display apparatus of claim 7, wherein the first material includes silicon oxide (SiOx), and
   the second material includes silicon nitride (SiNx), titanium oxide (TiOx) or niobium oxide (NbOx).

10. The touch display apparatus of claim 1, wherein a maximum value of the second refractive index is greater than a maximum value of the refractive index of the touch electrode by a difference, wherein the difference is equal to or less than 0.1.

11. A method of manufacturing a touch display apparatus, the method comprising:
    forming a touch electrode on a first surface of a first substrate;
    depositing an insulating layer on first surface of the first substrate on which the touch electrode is formed;
    forming a second substrate facing a second surface of the first substrate opposite the first surface of the first substrate;
    forming a liquid crystal layer between the first substrate and the second substrate; and
    patterning the insulating layer to form an insulating pattern, wherein the insulating pattern comprises a first sub insulating pattern having a first refractive index less than a refractive index of the touch electrode, and a second sub insulating pattern having a second refractive index greater than the first refractive index, and wherein the first sub insulating pattern directly contacts the touch electrode and the first substrate on a first side, and directly contacts the second sub insulating pattern on a second side opposing the first side,
    wherein the refractive index of the touch electrode is greater than the first refractive index and less than the second refractive index so that a refractive index of the insulating pattern is substantially the same as the refractive index of the touch electrode.

12. The method of claim 11, wherein the touch electrode comprises a transparent conductive material.

13. The method of claim 11, wherein the touch electrode comprises a pad electrode,
    wherein the insulating pattern comprises a contact hole extending to the pad electrode.

14. The method of claim 11, wherein the refractive index of the touch electrode is equal to or greater than about 1.7 and equal to or less than about 2.2.

15. The method of claim 11, wherein the first refractive index is equal to or greater than about 1.4 and equal to or less than about 1.6, and
    the second refractive index is equal to or greater than about 1.8 and equal to or less than about 2.3.

16. The method of claim 11, wherein the first sub insulating pattern includes silicon oxide (SiOx), and
    the second sub insulating pattern includes silicon nitride (SiNx), titanium oxide (TiOx) or niobium oxide (NbOx).

17. The method of claim 11, wherein a refractive index of the insulating pattern is substantially equal to the refractive index of the touch electrode, and wherein the insulating pattern comprises:
    a first material having the first refractive index; and
    a second material having the second refractive index.

18. The method of claim 17, wherein the first refractive index of the first material is equal to or greater than about 1.4 and equal to or less than about 1.6, and
    the second refractive index of the second material is equal to or greater than about 1.8 and equal to or less than about 2.3.

19. The method of claim 11, wherein the patterning of the insulating layer is done after the liquid crystal layer is formed between the first substrate and the second substrate.

20. A touch display apparatus comprising:
    a first substrate;

a touch electrode disposed on a first surface of the first substrate;
a connecting line;
a pad electrode electrically connected through the connecting line to the touch electrode;
an insulating pattern disposed on the touch electrode, wherein the insulating pattern comprises a first sub insulating pattern and a second sub insulating pattern on the first sub insulating pattern, wherein the first sub insulating pattern has a first refractive index less than a refractive index of the touch electrode, wherein the second sub insulating pattern has a second refractive index greater than the refractive index of the touch electrode, and wherein the first sub insulating pattern directly contacts at least one of the touch electrode and the connecting line, separates the second sub insulating pattern from each of the touch electrode and the connecting line, and directly contacts the second sub insulating pattern;
a second substrate facing a second surface of the first substrate opposite the first surface of the first substrate;
a liquid crystal layer disposed between the first substrate and the second substrate; and
an insulating layer,
wherein the insulating layer directly contacts each of the first sub insulating pattern, the touch electrode, the connecting line, the pad electrode, and the first substrate.

* * * * *